(12) United States Patent
Golubovsky et al.

(10) Patent No.: US 10,042,909 B2
(45) Date of Patent: Aug. 7, 2018

(54) SYSTEMS AND METHODS OF ELECTRONIC DATA PROCESSING

(71) Applicant: Nasdaq, Inc., New York, NY (US)

(72) Inventors: Leo Golubovsky, Franklin Lakes, NJ (US); Chung-Sin Wang, Ridgewood, NJ (US)

(73) Assignee: NASDAQ, INC., New York, NY (US)

( * ) Notice: Subject to any disclaimer, the term of this patent is extended or adjusted under 35 U.S.C. 154(b) by 332 days.

(21) Appl. No.: 14/928,753

(22) Filed: Oct. 30, 2015

(65) Prior Publication Data

US 2017/0103115 A1    Apr. 13, 2017

Related U.S. Application Data

(60) Provisional application No. 62/239,173, filed on Oct. 8, 2015.

(51) Int. Cl.
*G06F 17/30* (2006.01)

(52) U.S. Cl.
CPC .. *G06F 17/30575* (2013.01); *G06F 17/30011* (2013.01)

(58) Field of Classification Search
CPC combination set(s) only.
See application file for complete search history.

(56) References Cited

U.S. PATENT DOCUMENTS

| 8,005,745 B1 | 8/2011 | Cleaves et al. | |
| 2013/0325687 A1* | 12/2013 | Lavalle | G06Q 40/04 705/37 |
| 2014/0180905 A1* | 6/2014 | Parsons | G06Q 40/04 705/37 |
| 2015/0032590 A1* | 1/2015 | Fay | G06Q 40/04 705/37 |
| 2015/0206235 A1* | 7/2015 | Kenyon | G06Q 40/04 705/37 |
| 2016/0078537 A1* | 3/2016 | Katsuyama | G06Q 40/06 705/37 |
| 2017/0004563 A1* | 1/2017 | Noviello | G06Q 30/0633 |

(Continued)

OTHER PUBLICATIONS

Fleming, M. J., et al., "The Microstructure of a U.S. Treasury ECN: The BrokerTec Platform," Federal Reserve Bank of New York Staff Reports, Jul. 2009 (63 pages).

(Continued)

*Primary Examiner* — Farhan Syed
(74) *Attorney, Agent, or Firm* — Nixon & Vanderhye P.C.

(57) ABSTRACT

An electronic exchange computing system is provided that includes a computer storage system, at least one transceiver, and a processing system. The storage system stores an electronic order book. The transceiver receives data transaction requests and transmits messages of an electronic data feed. The processing system determines that a first order has priority and generates a new order ID for the first order. The first order is maintained in the electronic order book (e.g., with a quantity of 0). Additional order instructions are received from a client computer system and are associated with the first order. A match is found based on the additional order instructions. A data feed update message is generated and transmitted as part of a real-time data feed and includes the newly generated order ID for the first order.

20 Claims, 12 Drawing Sheets

(56) References Cited

U.S. PATENT DOCUMENTS

| | | | |
|---|---|---|---|
| 2017/0004578 A1* | 1/2017 | Cooper | G06Q 30/0633 |
| 2017/0038919 A1* | 2/2017 | Moss | G06Q 10/00 |
| 2017/0103115 A1* | 4/2017 | Golubovsky | G06F 17/30575 |
| 2017/0103460 A1* | 4/2017 | Golubovsky | G06Q 40/04 |
| 2017/0123876 A1* | 5/2017 | Bradbury | G06F 9/467 |
| 2017/0126683 A1* | 5/2017 | Bradbury | G06F 9/467 |
| 2017/0262847 A1* | 9/2017 | Smith | G06Q 20/401 |

OTHER PUBLICATIONS

NASDAQ TotalView—ITCH 4.1 (22 pages), retrieved Oct. 30, 2015.
NASDAQ TotalView—ITCH 5.0 (29 pages), retrieved Oct. 30, 2015.
http://www.nasdaqtrader.com/Trader.aspx?id=DPSpecs, retrieved Oct. 30, 2015 (5 pages).
U.S. Appl. No. 14/928,644, filed Oct. 30, 2015 (70 pages).

* cited by examiner

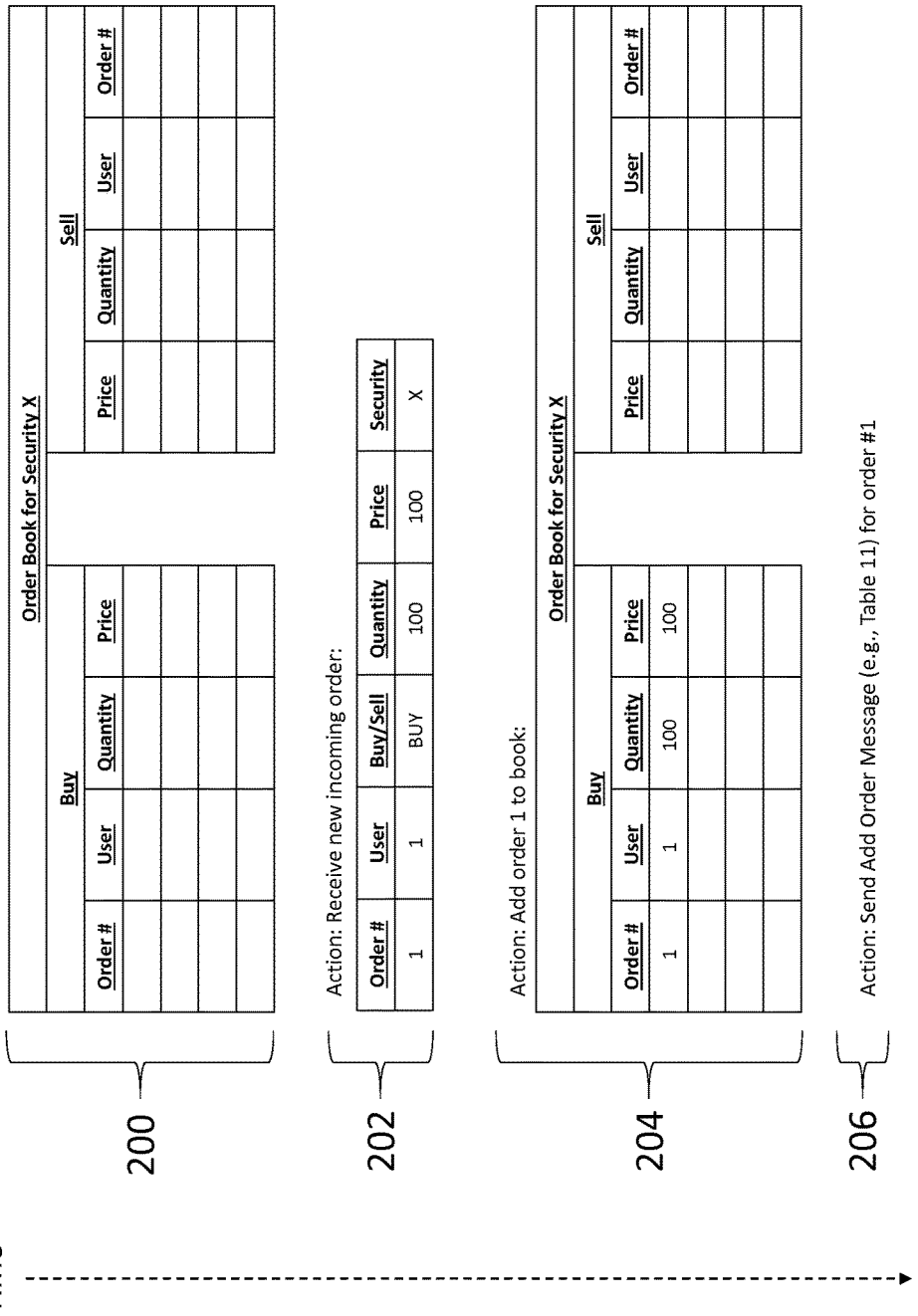

Fig. 2B

FIFO (NO PRIORITY)

208 — Action: Receive new order:

| Order # | User | Buy/Sell | Quantity | Price | Security |
|---|---|---|---|---|---|
| 2 | 2 | BUY | 5 | 100 | X |

210 — Action: Add order 2 to book:

Order Book for Security X

| Buy | | | | Sell | | | |
|---|---|---|---|---|---|---|---|
| Order # | User | Quantity | Price | Price | Quantity | User | Order # |
| 1 | 1 | 100 | 100 | | | | |
| 2 | 2 | 5 | 100 | | | | |
| | | | | | | | |
| | | | | | | | |

212 — Action: Send Add Order Message (e.g., Table 11) for order #2

214 — Action: Receive new order:

| Order # | User | Buy/Sell | Quantity | Price | Security |
|---|---|---|---|---|---|
| 3 | 3 | SELL | 110 | 100 | X |

Time →

Fig. 3A

FIFO (WITH PRIORITY)

300 — Order Book for Security X

| Buy | | | | Sell | | | |
|---|---|---|---|---|---|---|---|
| Order # | User | Quantity | Price | Price | Quantity | User | Order # |
| | | | | | | | |
| | | | | | | | |
| | | | | | | | |

302 — Action: Receive new incoming order:

| Order # | User | Buy/Sell | Quantity | Price | Security |
|---|---|---|---|---|---|
| 1 | 1 | BUY | 100 | 100 | X |

304 — Action: Add order 1 to book:

Order Book for Security X

| Buy | | | | Sell | | | |
|---|---|---|---|---|---|---|---|
| Order # | User | Quantity | Price | Price | Quantity | User | Order # |
| 1 | 1 | 100 | 100 | | | | |
| | | | | | | | |
| | | | | | | | |

306 — Action: Send Add Order Message (e.g., Table 11) for order #1

Time →

Fig. 3B

FIFO (WITH PRIORITY)

308 — Action: Receive new order:

| Order # | User | Buy/Sell | Quantity | Price | Security |
|---|---|---|---|---|---|
| 2 | 2 | BUY | 5 | 100 | X |

310 — Action: Add order 2 to book:

Order Book for Security X

| Buy | | | Sell | | |
|---|---|---|---|---|---|
| Order # | User | Quantity | Price | Price | Quantity | User | Order # |
| 1 | 1 | 100 | 100 | | | | |
| 2 | 2 | 5 | 100 | | | | |
| | | | | | | | |

312 — Action: Send Add Order Message (e.g., Table 11) for order #2

314 — Action: Receive new order:

| Order # | User | Buy/Sell | Quantity | Price | Security |
|---|---|---|---|---|---|
| 3 | 3 | SELL | 110 | 100 | X |

Time →

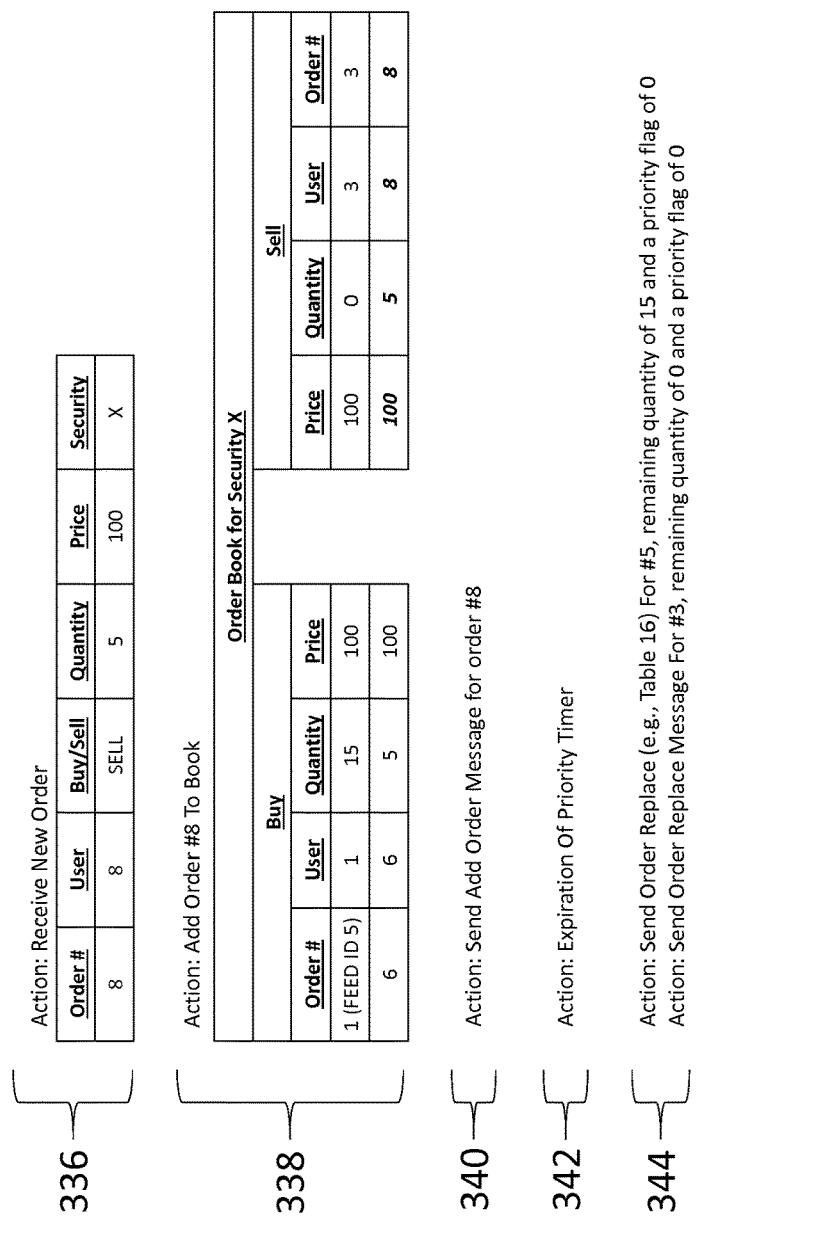

Fig. 3F

FIFO (WITH PRIORITY)

Action: Perform Match Process On Resting Book After Priority Timer Expiration

Order Book for Security X

| | Buy | | | | Sell | | |
|---|---|---|---|---|---|---|---|
| Order # | User | Quantity | Price | Price | Quantity | User | Order # |
| 1 (FEED ID 5) | 1 | 15 | 100 | 100 | 5 | 8 | 8 |
| 6 | 6 | 5 | 100 | | | | |

⎫
⎬ 346
⎭

Action: Match #5 With #8

Order Book for Security X

| | Buy | | | | Sell | | |
|---|---|---|---|---|---|---|---|
| Order # | User | Quantity | Price | Price | Quantity | User | Order # |
| 1 (FEED ID 5) | 1 | 10 | 100 | | | | |
| 6 | 6 | 5 | 100 | | | | |

⎫
⎬ 348
⎭

Action: Send Two-Sided Execution Message: Order #5 Against Order #8; no priority

⎫
⎬ 350
⎭

Time ------→

SYSTEMS AND METHODS OF ELECTRONIC DATA PROCESSING

CROSS REFERENCE TO RELATED APPLICATIONS

This application claims priority to U.S. Provisional Application No. 62/239,173, which was filed on Oct. 8, 2015, and is related to commonly assigned application Ser. No. 14/928,644 (published as U.S. Publication No. 2017-0103460), which was filed on Oct. 30, 2015, and U.S. Provisional Application No. 62/239,155, which was filed on Oct. 8, 2015, each of which is hereby incorporated by reference for all purposes.

TECHNICAL OVERVIEW

The technology herein relates to execution of electronic data processing requests. More particularly, the technology herein relates to maintaining a data structure of data processing requests and sending updates regarding handling of the data processing requests by using an electronic data feed.

INTRODUCTION

Data structures organize data in order to allow computers to efficiently work with, access, and/or use the information contained in the data structure. There are many different types of data structures and they have different strengths and weakness. Some data structures are efficient in helping a computer "find" a piece of information within the data structure, some are good for adding information to the data structure, some may be may be good for efficiently sorting the information, some may be easier for application developers to work with, and some data structures are developed with a specific application or type of application in mind. General data structures include arrays, trees, classes, and the like. An example of a more specific data structure is the document object model (DOM) data structure that allows modern day web browsers to efficiently work with and render most web content. Some data structures can also be a combination of various different types of data structures. For example, computer games can have a game state data structure that is comprised of trees, classes, arrays, and the like. Another example data structure is one used to store data processing requests (e.g., electronic orders) submitted to an electronic exchange computing system. This type of data structure is sometimes referred as an order book that stores the electronically submitted orders.

Another important area in computing technology is networking. Networking relates to techniques for quickly, efficiently, and/or reliably delivering digital data from one computing device to another. Networking can be related to advances in the physical medium that carries the data (e.g., copper versus fiber optics), different networking protocols responsible for encapsulating and delivering the data (e.g., TCP, UDP, ITCH, etc. . . . ), and application specific techniques that relate to how information for an application is transmitted between computers for that particular application or application type.

Computer games are an example of how application layer networking techniques (the application layer being the highest layer in the Open Systems Interconnection (OSI) communications model) can vary from game to game (in certain situations the presentation, session, and/or transport layer of the OSI model are also relevant to application-level networking techniques). For example, if a computer game communicates data to another computing device (e.g., over the Internet), then programmers may consider techniques for how that data should be transmitted. One way would be to send the whole data structure (e.g., the game state) of the game. Another way may be to send only parts of the data structure (e.g., those that are likely to be updated). Another technique may be to send only those parts of the data structure that have been updated. For example, if a video game character is moving, the position of that video game character may be transmitted. Yet another technique may be to only send the "inputs" that are used for the computer game application that is being executed in the disparate computing devices.

Other examples of application layer networking techniques relate to electronic exchange computing systems. For such systems there can be a vast quantity of data (e.g., thousands or millions of orders) stored in the electronic order book data structure. While one task of an electronic exchange is to store (and operate on) this data structure, another task or goal may be to provide information to market participants or the general public (e.g., external computing devices) as to the "state" of the market. In other words, what orders have been placed, what orders have been matched, what orders have modified or canceled, etc. . . . . Given the potential size of the information contained in this data structure and the desire that orders should be processed relatively quickly, an electronic exchange may use a data structure that provides fast access to the data stored therein, and may use networking techniques (e.g., including application layer networking techniques) that quickly and efficiently transmit data regarding operation of the electronic exchange computer system.

Techniques that relate to dissemination of this information may be referred to as electronic data feeds that allow users to receive electronic updates from electronic exchange computing systems. One example of an electronic data feed is Nasdaq's TotalView-ITCH ("TotalView") protocol or specification that Nasdaq provides to subscribers. TotalView operates and sends event message data that can allow for an efficient transfer of information from the exchange to the public for the public "marketplace" that is represented in the exchange (e.g., the order book and the changes made to the order book). For example, instead of streaming the state of the entire order book data structure after each update, only information on changes to the order book data structure is sent to market participants. Thus, for example, each limit order submission, cancellation, or execution (e.g., events that affect the order book) can result in an individual event message being streamed to market participants via the electronic data message feed. The total depth and view of the order book may be the sum of the (daily) history of events or messages.

In certain instances, developing a new computer application allows for consideration of different data structures, processing algorithms, and/or networking techniques. In other words, if the requirements or needs of a particular application are known at the time of development, then developers of such an application can select appropriate data structures and the like to accomplish the goals of the application. However, it is not always possible or feasible to "know" the requirements of an application when it is being developed for the first time. Indeed, many application requirements or needs only become known after an application is deployed and being used. In other words, the data structures or the like for an application may be already selected when a new application feature is desired. One problem in the art is thus that previously selected and implemented data structures, processing algorithms, and/or networking techniques may be incompatible (to varying degrees) with newly desired application features. One possible solution is to simply re-develop the entire application to take the new feature in mind. However, this type of solution may not be possible (or at least overly expensive and/or time consuming relative to the benefit offered by the new feature).

Developers can weigh the pros and cons of how new features can be implemented given the context of the desired feature and the state of the existing application and its implementation. In certain circumstances, modifying how the processing of the data structure (e.g., an algorithm) occurs may be the most feasible way to implement a feature. In other circumstances, it may be more difficult (e.g., expensive, risky, time consuming, etc. . . . ) to modify the processing aspect of an application and accordingly a data structure and/or the networking aspect may be updated instead. Also, in other circumstances, loosely coupled applications (e.g., secondary applications that rely upon data provided by the primary application) may no longer function properly if the changes to, for example, the networking of the first application are updated. For example, in the context of electronic exchange computing systems, clients may have their own applications depend on the data provided by the electronic data feed. Accordingly, if how the data is provided by the electronic data feed is changed, those application may no longer function properly. These additional considerations may thus be taken into account when developers contemplate how new features should be integrated into existing data structures, processing requirements, and/or networking techniques.

There is thus a need for new techniques that allow, for example, data structures, application processing, and networking techniques to function and effectively provide desired functionality. There is also a need for techniques to incorporate new or additional features into existing data structures, application processing, and/or networking implementations. Such techniques may also be desired in the context of electronic trading systems that involve complex data structures (e.g., an order book), processing functionality (e.g., processing logic of a matching engine), and networking technology (e.g., electronic data feeds such as Nasdaq's ITCH protocol).

SUMMARY

In certain example embodiments, a real-time market data feed from an exchange is provided that includes indications of whether an order(s) has priority or is being traded with priority. In certain example embodiments, when an order book is in a workup state, the real-time market data feed provides updates on the status and/or state of the workup as it is in progress. Such updates may reference a new priority order identifier that is generated when an order enters a work-up state.

In certain example embodiments, an electronic exchange computer system is provided and include a computer storage system a transceiver, and a processing system. The computer storage system stores an electronic order book that can hold a plurality of pending orders. The transceiver (or multiple different transceiver) are configured to receive new orders (or modifications to existing orders) from client computer systems. The transceiver(s) is also configured to transmit updates or changes to the electronic order book that are part of an electronic data feed (e.g., a real-time market data feed). The processing system is configured to determine that at least a first order has priority over other orders in the electronic order book and then generate a new order ID (e.g., a "fake" order id) for the work-up or priority state that the order will be placed into. Additional order actions (e.g., modification or addition of further size to the first order) may be received from client computing systems and generate further matches during a priority trading mode (e.g., a workup state) of the exchange computing system. In response to an order being matched with priority, updates for the electronic data feed may be generated and transmitted. The message updates may include the new order ID of the first order and data indicating the match of the at least some of the additional quantity of the first order and that the match was performed using the priority of the first order.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 2A-2C show a series of actions taken by an electronic exchange computer system and corresponding states of an electronic order book;

FIGS. 3A-3F show a series of actions taken by an electronic exchange computer system and corresponding states of an electronic order book according to certain example embodiments;

DETAILED DESCRIPTION

Figure 1:
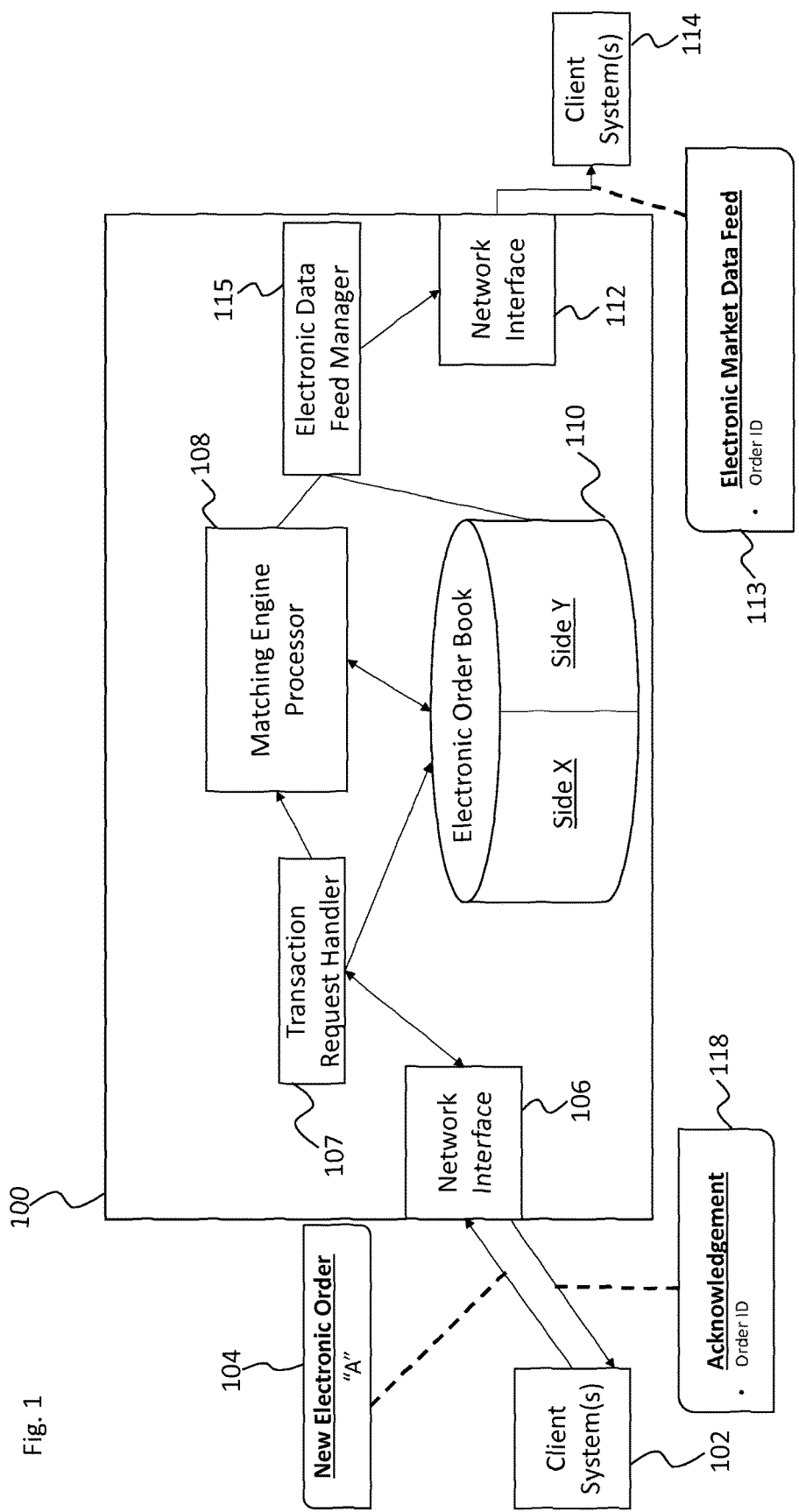
FIG. 1 illustrates a non-limiting example function block diagram of a computer-implemented exchange system that implements an example electronic order processing and electronic market data feed according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Section headings are used throughout this Detailed Description solely in order to orient the reader as to the general subject matter of each section; as will be seen in the following text, the description of many features spans multiple sections, and headings should not be read as affecting the meaning of the description included in any section. For example, the inventors contemplate combinations of features that are discussed more than one of the sections.

Overview

In certain example embodiments, an automated electronic exchange computing system is provided that receives and processes orders on a price/time basis. Third parties keep track or maintain a public order book based on electronic data messages (e.g., as part of a real-time order-based market data feed) transmitted from the exchange. An example protocol for providing such updates is discussed below. In certain example embodiments, order modifications or supplemental orders may be submitted by client computer systems when a previous order is given priority. For example, if order A for 100 is first in the order book (e.g., first on a price/time basis or some other ordering scheme) and is fulfilled by a contra-side order, the client that submitted the original 100 order may have the option (e.g., via their respective computer systems) to submit additional quantity for trading using the priority of order A. During this period, no other orders on that side of the order book may trade. In effect, the order book may become locked while the client associated with order A is given the opportunity to trade additional quantity. In certain example embodiments, the additional trading actions (e.g., the submission of the modification order and any trades association with the modification order) may result in the exchange generating and transmitting market updates as part of the real-time public market data feed. Once such example real-time update message is shown in table 14 below. Such messages may provide third party client computer systems (e.g., those not involved in any current trades being executed) information that the order book as entered a priority trading mode. The messages may also provide information on the executed quantity of the priority executed trades.

Consider a situation where two parties have counter-party orders in an order book and are trading a particular instrument back and forth between themselves. Party A offers 20, party B then bids 30 (resulting in a trade of 20 between A and B). Party A may then be presented with a chance to trade addition size and submits a further order for 20 (resulting in a trade for 10 between A and B). Party B then submits another order for 10 (resulting in a final trade of 10 between A and B). Parties A and B may be given the option to trade additional size, but may decline to continue trading. These trades may nominally occur in a "public" market—but are more like private transactions. In such a situation, the networking for real-time market data feeds may not report the results of all 3 of the "private" trades between A and B because the trade information of the successive trades (e.g. the workup) is not available to a real-time electronic market data feed. Indeed, in certain instances when this type of workup is occurring there may be no external notice to third party client computer systems that indicate that this "private" trading action is occurring in the market. This can be problematic in certain situations because the private trading may necessitate blocking (or locking) the order book for a given security.

Figure 2C:
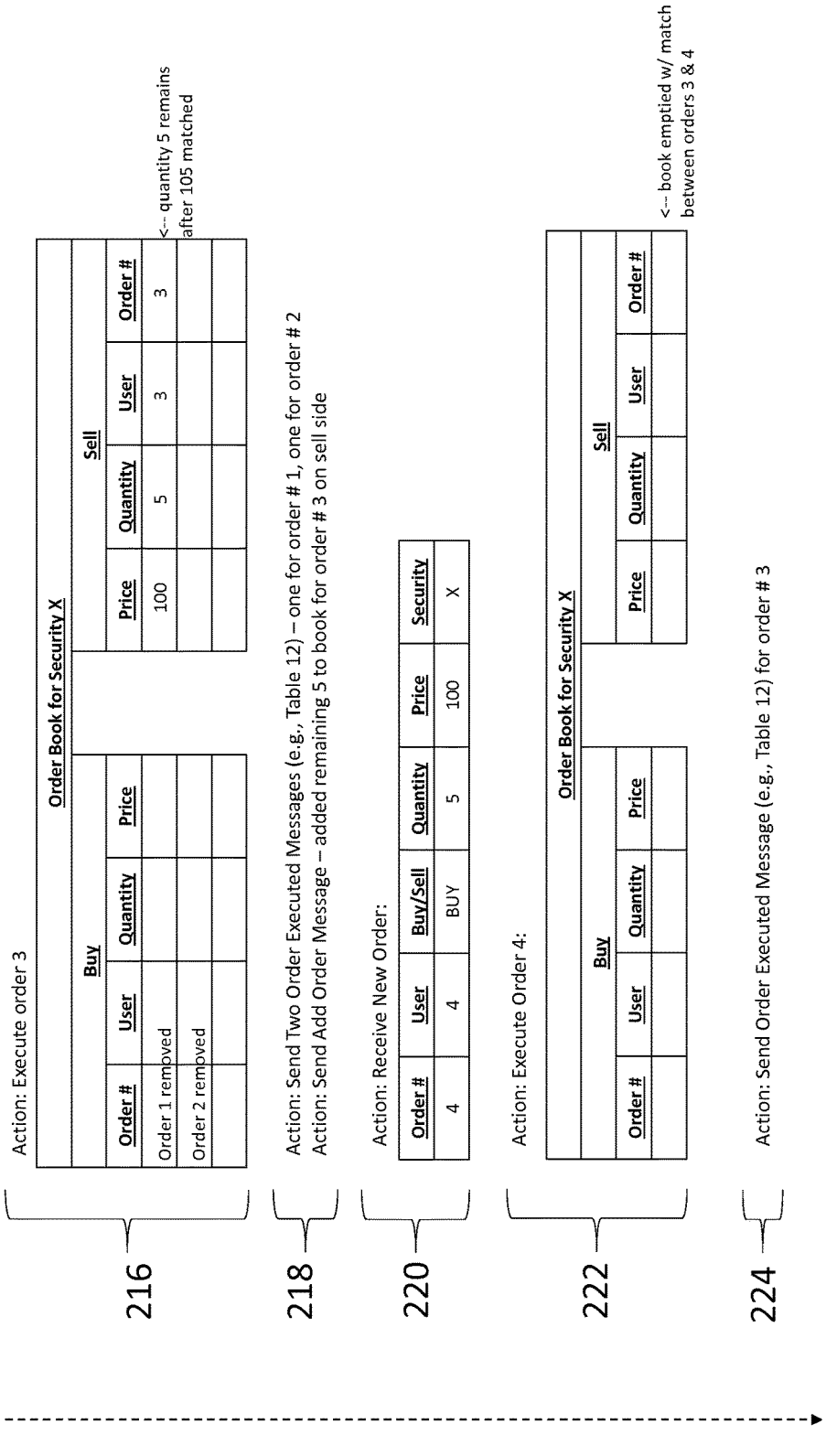
Figure 4:
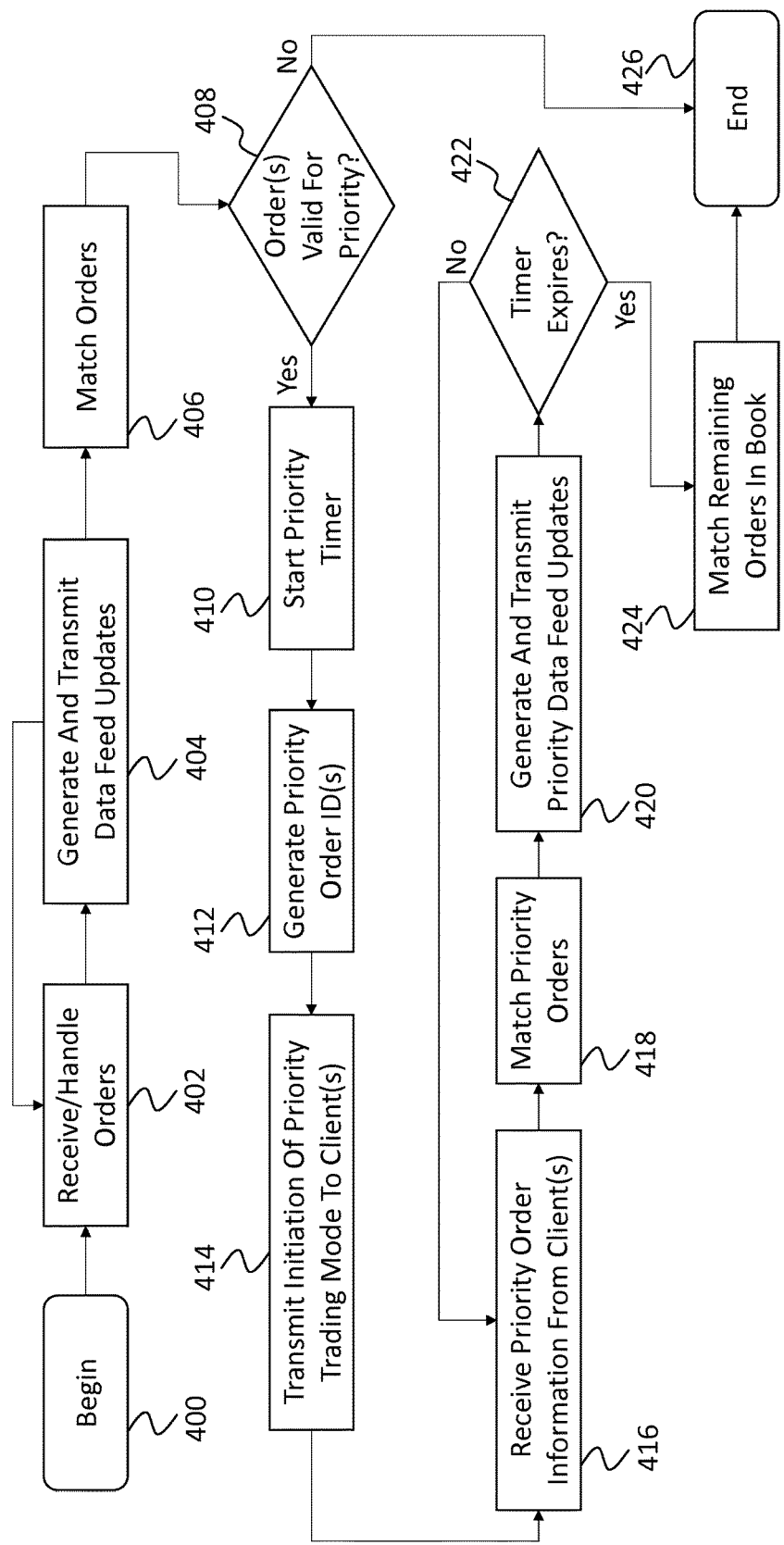
FIG. 4 is a flow chart of an example computer process implemented on an exchange computing according to certain example embodiments.
Figure 5:
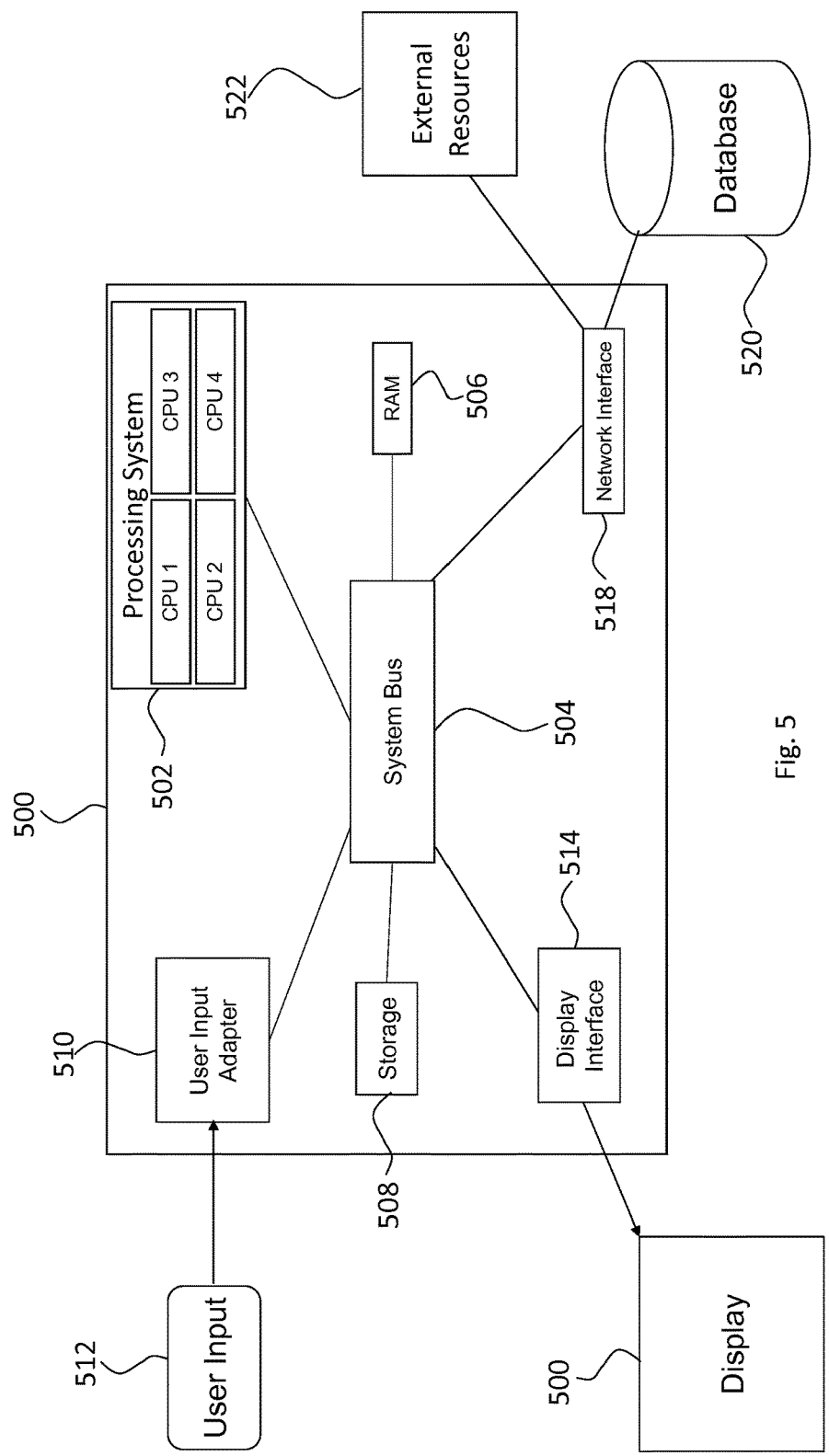
FIG. 5 is an example computer system according to certain example embodiments.

FIG. 1 shows an example exchange computing system in function-block form where the functions may be implemented on, for example, the example computer system shown in FIG. 5. FIGS. 2A through 2C show an example implementation where orders are not processed with priority after being fulfilled. FIGS. 3A through 3F shown an example implementation where orders are processed with priority after being fulfilled. In the implementation shown in FIGS. 3A through 3F, client computer systems that submit orders can obtain (or maintain) priority (e.g., the "top" of the order book queue, which is sorted on a Price/Time basis) are given the opportunity to "add" additional quantity to the orders after fulfillment of their orders. FIG. 4 is an example programmatic algorithm that may be implemented by the electronic exchange computing system shown in FIG. 1 (e.g., to produce the results shown in FIGS. 3A-3F). The figures thus describe, among other things, that additional quantity is matched based on the priority position of an originally fulfilled order ID. However, updates regarding quantity that is added after fulfillment are provided in connection with a newly generated order ID. In other words, for the added quantity, the electronic exchange performs match processing using the "old" ID, while sending updates (e.g., over an electronic data feed) concerning the added quantity using a "new" order ID. To put it another way, one ID is used for internal processing by the exchange computing system and another ID is used to send updates regarding that processing (e.g., when there is match, when the order is modified, etc. . . . )

Description of FIG. 1

By way of introduction, FIG. 1 illustrates a non-limiting example function block diagram of a computer-implemented exchange system 100 ("exchange" 100 hereafter) that implements example electronic order processing via transaction request handler 107 and/or matching engine processor 108 and electronic market data feed manager 115 according to certain example embodiments.

Exchange 100 may be implemented on one or computer computing servers or systems; such as the computer system shown in FIG. 5.

Exchange 100 includes network interface 106 for communicating with client systems 102 that submit data transaction requests, such as electronic order 104. Client systems 102 can be personal computers, mobile devices, automated computer systems, and the like. Generally, client systems 102 are any computer system programmed to interface with exchange 100 for the purpose of submitting data transaction requests, such as electronic orders 104.

Electronic data messages are submitted to exchange 100 via network interface 106 and include data transaction requests (e.g., a data transaction request to match a submitted order to a pending, or future, contra-side order, a data transaction request to modify an existing order, a data transaction request to cancel an existing order, a data transaction request to modify an existing order with priority, when the matching engine for the exchange has entered a priority or workup mode, etc. . . . ). Data transaction requests (e.g., electronic orders) can include various fields or attributes. Some fields may include, for example, a client ID that identifies the client sending the request (e.g., a company, person, etc. . . . ), an instrument ID that identifies a particular instrument (e.g., a ticker symbol or the like), transaction type ID that may identify, for example, whether the request is associated with a sell or buy instruction, an order attribute that specifies whether this a regular order, a discretion order, a midpoint order, or the like, a quantity value that indicates the quantity of the order, a MinOrder value that indicates a minimum order amount that this order can be matched against, a price value that indicates a particular price for the order subject to the data transaction request, and whether the order is a "buy" or "sell" order (e.g., which side of the electronic order book is the new order going to interact with). In certain examples, other fields may be defined in the electronic order and/or some may be optional.

Once a data transaction request is received at network interface 106, it is passed to transaction request handler 107 for validation. Transaction request handler 107 validates newly received data transaction requests by confirming the fields in the request are valid. For example, certain types of orders may require a minimum order size. In accordance with such a requirement, transaction request handler 107 performs a check to ensure the minimum order size has been satisfied. If the validation check fails, a response message may be generated and transmitted back to the submitting client system 102 indicating that the order has been rejected and an explanation (e.g., an error code) as to why the order failed.

In certain example embodiments, and as explained in greater detail below, the transaction request handler (or another component of the exchange) may be responsible for generating and sending electronic data messages to client systems once their previously submitted orders have been given priority. Such a message may indicate to a client they their order has priority, a priority trading mode has been activated for the order book, and that they have a certain amount of time to submit additional size for trading.

After (or in conjunction with) the transmission of an acknowledgement message, the new data transaction request (e.g., to add an order to the order book, to execute an order, etc. . . . ) is passed to the matching engine processor 108. For newly received aggressive orders, matching engine processor 108 may attempt to match against contra-side resting or passive orders in electronic order book 110. In certain example embodiments, the transaction request handler (or another component) will interact directly with electronic order book to, for example, modify or cancel an order (e.g., if the data transaction request is for modifying or canceling).

Transaction request handler 107 and/or matching engine processor 108 can be a combination of hardware (e.g., a hardware processor, such as a central processing unit) and software or just hardware (e.g., a suitably designed application-specific integrated circuit or field programmable gate array).

In certain example embodiments, in addition or alternatively to matching incoming aggressive orders, matching engine processor 108 may attempt to match orders already stored in the electronic order book 110 (e.g., two "resting" or "passive" orders). For example, market conditions (e.g., the state of the order book for a particular instrument) may change and cause two orders that were previously stored in the order book to match (or cross). In another example, when a priority initiated trading mode ends, there may be orders resting in the electronic order book (e.g., those that did not have priority) that may be eligible for matching (e.g., now that one or more orders are not blocking other orders from trading). In any event, in response to such a change, matching engine processor 108 may identify two (resting) orders that can match and trigger the execution of a trade between those two orders.

In certain example embodiments, each security and/or electronic order book is assigned its own matching engine processor. In such instances, one matching engine per order book may be implemented and deployed. Such implementations may provide parallelism benefits and allow an exchange to handle tens, hundreds, thousands, or even millions of different securities (or order books) and millions or billions of trades each day.

In certain example embodiments, the matching engine processor may be configured or programmed to control order book processing to switch to a priority trading mode in which orders that have priority in the order book are given the opportunity to be supplemented with further quantity when the original quantity is exhausted. In other words, a customer/client/user/etc. . . . , due to their order having priority initially, may be given the opportunity to add or modify quantity. In certain example embodiments, when the quantity for an order that has priority is exhausted (e.g., its size is 0), the order may remain in the order book as a placeholder (and thus with priority). Subsequent data transaction requests from the client associated with that order may use the priority positioning of the now exhausted order. However, processing performed after the initial order has been exhausted may use a different order ID. In certain example embodiments, the "old" order ID is internally maintained by the exchange and the matching engine processor (and the client), but a new external or "public" order ID is generated and used when updates are sent out via one or more public market data feeds (e.g., that are real-time data feeds) for action associated with the "new" order.

Returning to FIG. 1, electronic order book 110 can be a data structure (e.g., a database, flat file, list, etc. . . . ) that holds multiple entries in electronically accessible memory (e.g., RAM, cache, registers, hard disk drives, etc. . . . ). Typically, an electronic order book has two sides, side X and side Y, which can be bid and offer/ask or buy and sell sides for the same instrument in the same electronic order book. The type of instrument that the order book is associated with can vary based on implementation and can include, for example, bonds (e.g., U.S. treasury notes of various denominations), stocks, and the like.

In certain example embodiments, processes performed by exchange 100 (e.g., matching, modifying, or canceling orders) in response to submitted data transaction requests may cause electronic data feed manager 115 to generate messages that are transmitted as part of market data feed 113 to other client systems 114 (e.g., that are associated with market participants) via network interface 112. As discussed herein, an example of a market data feed or protocol is the ITCH protocol from Nasdaq. An example protocol according to certain example embodiments is set forth below. Such protocols may generate (e.g., in real-time) messages for market data feeds. For example, a trade execution message (e.g., matching of two orders) may be included in market data feed 113. In certain example embodiments, trade execution message may include a transaction ID as is disclosed in co-pending Application "SYSTEMS AND METHODS OF ELECTRONIC DATA MESSAGE TRANSACTION IDENTIFICATION,"62/239,155, the entire contents of which are hereby incorporated by reference.

Description of FIGS. 2A-2C

FIGS. 2A-2C show a series of actions taken by an electronic exchange computer system and corresponding states of an electronic order book. 200 in FIG. 2A shows an initial state of an electronic order book for instrument X of an exchange. In step 202, a new order is received from user 1 (which may be a client identifier or an identifier for an individual user). Order 1 in step 202, is a BUY order for 100 at 100 for instrument X and is added to the electronic order book in step 204. In accordance with, or in response to, the addition of order 1 to the electronic order book, an electronic message is generated and transmitted from the exchange (or another associated computing system) as part of a real-time electronic market data feed. An example such message is shown in Table 11 of the below discussed example protocol.

Continuing in FIG. 2B and step 208, a further new order is received. This new order is assigned an order ID of 2 (e.g.

by the transaction request handler) and is correspondingly added to order book of security X in step 210 (e.g., the matching engine processor attempts to find a match, does not, and adds the new order to the order book). In step 212, an add order message is generated and transmitted as part of the public market data feed.

In step 214, another new order is received and is from user 3. This new order is assigned an ID of 3 and is a SELL order for 110 at 100 for security X. Continuing in FIG. 2C and step 216, order 3 (a sell order) is executed by the matching engine processor against the resting buy orders in the electronic order book. As a result, in step 216, orders 1 and 2 are matched against the 110 of order 3 and are correspondingly removed from the electronic order book (e.g., because they have been fulfilled). As there is 5 remaining quantity for order 3, the remaining quantity is added to the electronic order book.

In step 218, the exchange generates and transmits data feed updates regarding the matched trades and the newly added order. Specifically, two order execute messages (e.g., Table 12 in the below example specification) are generated and transmitted, respectively, for orders 1 and 2. In addition, another add order message is generated for order 3 for the remaining 5 quantity.

In step 220, a further order, order 4, is received. This new order is passed onto the matching engine processor in step 222, which then matches order 4 with the remaining 5 from order 3. The exchange generates and updates (e.g., in real-time with the execution of the trade between orders 3 and 4) the public market data feed in step 224 with order executed message for order 3. The order book is now empty.

Description of FIGS. 3A-3F

FIGS. 3A-3F show a series of actions taken by an electronic exchange computer system and corresponding states of an electronic order book according to certain example embodiments. Here, steps 300-314 in FIGS. 3A-3B correspond to steps 200-214. In other words, the state of the electronic order book is shown in step 310 when new order 3 is received.

After receiving order 3 in step 314, the matching engine processor executes order 3. As with the example in FIG. 2C, order 3 for 110 is matched against orders 1 and 2, for 100 and 5 respectively. In certain example embodiments, all of the orders at a price level are matched before a priority mode is initiated. In other example embodiments, even if there are other orders at the same price level as the priority order, a priority mode may be initiated. Thus, for example, upon matching 3 and 1 in step 316, a priority mode may be initiated prior to matching against order 2. In such a situation, user 1 may have the opportunity to be matched against orders that would otherwise match against order 2.

In certain example embodiments, when an order is matched against a contra-side order, the matching engine processor determines if that order is eligible for priority or further workup. This may include determining if the original size of the order was greater than a threshold size (e.g., 100 in the example of FIG. 3C), if the order being matched had priority within the order book (order 1 had priority, but order 2 did not), if the order has been submitted from a certain type of client (e.g., workup may only be eligible for certain client types), and the like. In the example shown in FIGS. 3A-3F, for an order to be eligible for further priority or workup it must have met or exceeded an order size of 100 and must be first in the order book. Based on these elements, order 1 is eligible for further priority ordering (size of 100 and "first" in the order book or at the top of the FIFO queue), but order 2 is not (does not meet the size requirement and does not meet the first in line requirement). In certain example embodiments, an order may eligible for further priority if it is not the first order, but still meets the other requirements. In other words, if orders 1 and 2 were flipped in priority (order 2 being submitted before order 1), then order 1 may still be eligible because it may be the first order that is eligible for priority (because it is the first order to meet the minimum size requirement).

In any event, upon determining that at least one of the matched orders meets the requirement for further priority matching, the matching engine processor may hold the now 0 quantity order ID 1 in the order book as a place holder. By holding the order in the order book (even though it has 0 quantity), the matching engine processor is holding a place in the FIFO queue of the order book to allow the client/user associated with order 1 to place an order for additional quantity using that priority. As part of this process, the exchange (e.g., the matching engine processor) may assign a new (or additional) order ID to order ID 1 (in this case Feed ID 5). This additional identifier is used to identify any additional actions taken during the priority trading process for the prioritized order. In other words, data update messages that are sent out as part of an electronic data feed may reference "5" as the identifier instead of "1." In certain example embodiments, if an aggressive order (e.g., order 3) has priority, then that order is not given a new identifier because it was not already in the electronic order book. In certain example embodiments, each time an order is exhausted and new size is "added" to the place holder order, a new ID may be generated. Thus, for example, if user 1 submits an additional 20 for order ID 5 and that is successfully traded, and then subsequently submits another 20, the second 20 may be associated with yet another order ID (generated in the same manner as order ID 5).

Returning to FIG. 3C, as part of the initialization of the prioritized trading mode (e.g., a workup process) by the matching engine, a priority timer is started in step 318. This timer may be configured on a client, instrument, price, volume, or other variable basis (e.g., the size initially associated with an identified prioritized order may result in setting the timer to a longer period of time). In certain example embodiments, the timer is a flat value applied equally across clients, different instruments, prices, and/or volumes. The start of the timer may indicate the matching engine processor has switched into a prioritized trading mode in which only those orders that have priority (order 1/5 and 3 in the example shown in FIG. 3C) may trade. As part of the initialization process, the exchange generates and sends an electronic data message to user 1 indicating that a prioritized trading mode has been initiated for 1 (which now has a public ID of 5).

Once the priority trading mode has been initiated, other orders that either are in the order book, or are received by the exchange during this time are locked out or not tradable during this time period. In other words, the public order book may effectively become "private" between the two contra-side clients (in this example user 1 and user 3). In certain example embodiments, both sides of an order book may be locked (e.g., two contra-side orders have priority to trade—thus preventing any other orders from trading). In other example embodiments, only one side of the order book may have priority while the other side may operate normally (e.g., one order with priority may trade against multiple different orders during the priority trading mode).

Figure 3C:
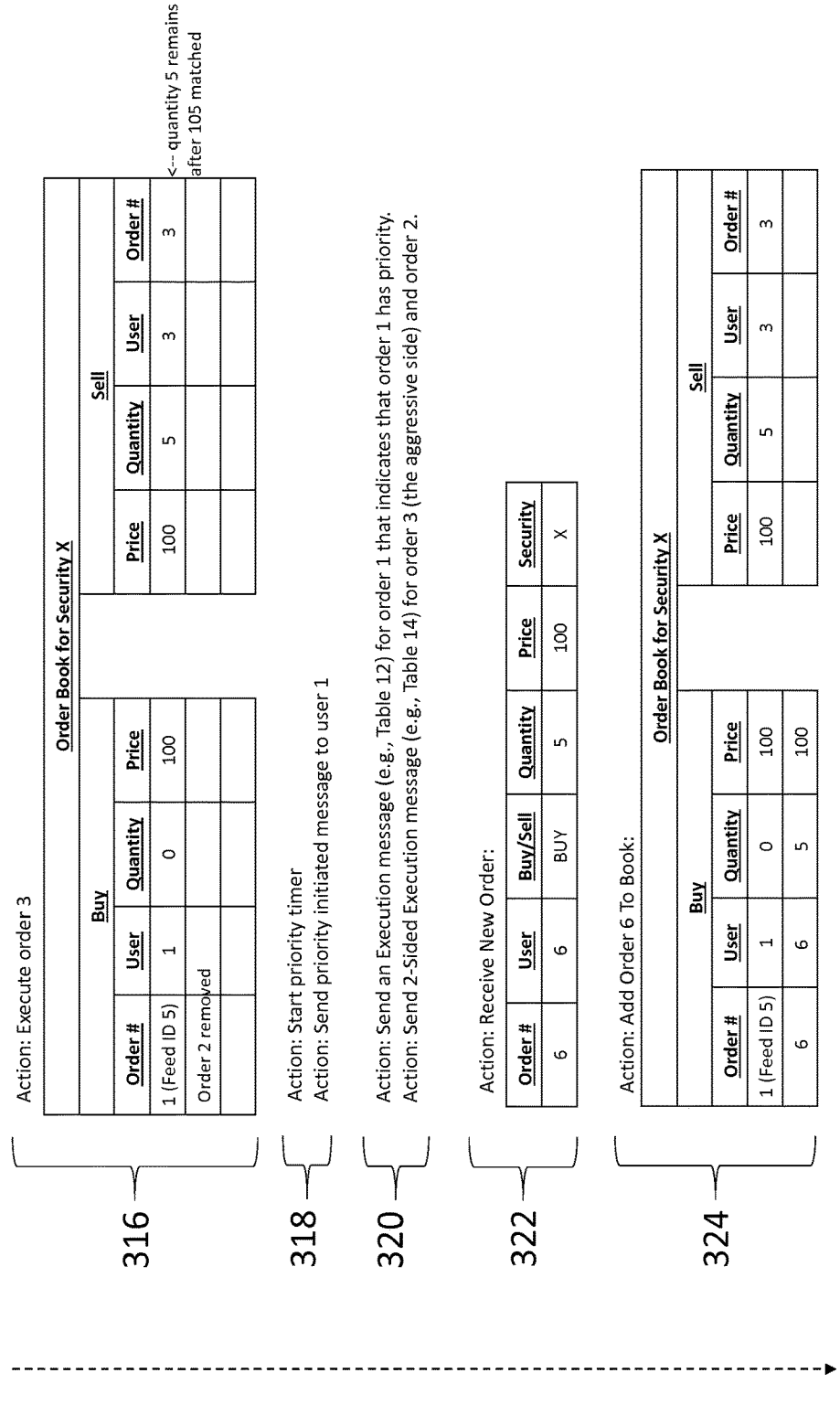
Figure 3D:
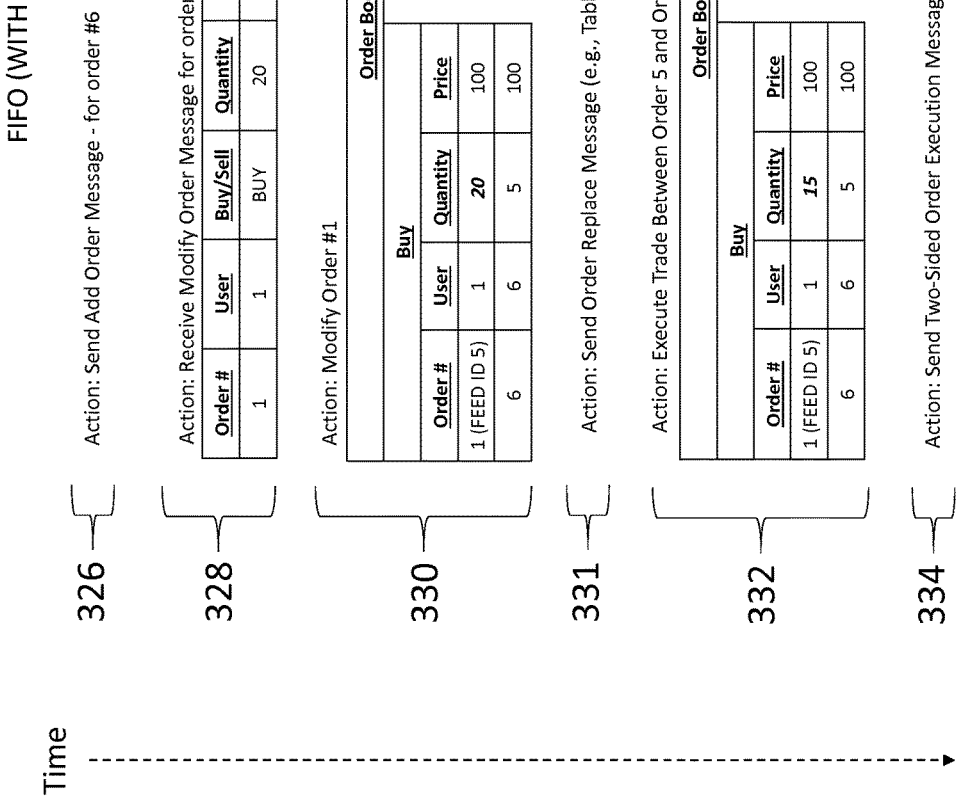

In the example in FIG. 3C, both order 1 and order 3 are eligible for priority as they both had (e.g., were submitted with) a size of more than 100 (which is the minimum size requirement to be eligible for priority). In step 320, the exchange generates and transmits real-time electronic market data feed updates based on the matching of the orders in step 316. Accordingly, an order executed message (e.g., as shown in table 12) may be generated based on the matching between order 3 and order 1. The order execution message may indicate order 1 has been matched for 100. The order execution message may also include new order ID (e.g., the priority order reference number) to indicate that order 1 now also has priority. A two-sided execution message may also be generated and sent based on the matching performed between order 3 and order 2.

In certain example embodiments, instead of sending an order executed message (e.g., table 12) for order 1, a 2-Sided execution message may be generated and sent for order 3 (the aggressive side) and order 1 (which also indicates the new ID of 5 to indicate that order ID 1 has priority).

Advantageously, the example two-sided execution messages provide data fields for the real-time public electronic market data feed that can indicate a priority mode has been initiated (e.g., that both orders 3 and 1 have priority) on the exchange. For example, a priority flag bit may be flipped on (e.g., the aggressive priority flag in Table 14) or an order ID may be passed for an order that has priority during a priority trading mode (e.g., Priority Passive Order Reference Number in Table 14, which may be the newly generate ID for a passive order ID). The two-sided execution message may include information for the execution of an order along with and "add" message for an order associated with the "new" priority order ID (e.g., a "fake" order ID 5).

In step 322, a new order is received from user 6 and is added to the order book in step 324. This occurs even though the matching engine has switched to a priority trading mode in which orders that have priority are the only orders actively trading. Even though order 1 (order 5) has a size of 0 and order 6 has a size 5, no match will be executed between order 6 and the remaining 5 of order 3. Indeed, during this phase (e.g. while order 1 has priority) any order that is after order 1 in the order book will not be able to match with a contra-side order. Effectively, all other orders are waiting for the user associated with order 1 (5) to complete their additional orders (if any).

In accordance with the addition of order 6 to the order book, in step 326, an add order message is transmitted for order ID 6 as part of the electronic market data feed.

As discuss above, upon entering a priority trading mode, users or clients (or their associated computer systems) associated with orders having priority may be notified and given the opportunity to provide additional quantity for trading. Any newly submitted quantity based on a priority order will then use the priority position in the priority order. Here, user 1, after receiving a notification that order ID 1 has been fulfilled—but still has priority, submits a modification to pending order 1 in step 328. This modification adds an additional 20 size to pending order 1 as shown in step 330.

In response to modifying the side of pending order 1 (which has a feed ID of 5), an order replace message (e.g., as shown in Table 16) may be generated and transmitted as part of the electronic data feed in step 331. Here, the order reference number field uses the ID of 5 when transmitting the order update message as this is the new "public" ID for order ID 1. In other words, whenever a subsequent message is generated and sent as part of the data feed it will use the 5 identifier instead of the 1 identifier (unless quantity that is associated with 5 is exhausted and then another "new" ID may be generated and used—e.g., the process repeats). In certain examples, the order identifier of the order replace message (e.g., for the Order Reference Number field) is the original ID (e.g., 1).

After modifying order 1 to add an additional 20 size, the matching engine processor executes a matching process. As explained above, order 1 and order 3 are the only orders eligible to trade during the priority trading mode. In step 332, the matching engine processor identifies and executes a trade between order 1 and order 3 for 5 at 100.

As a result of the additional trade executed between order 1 and order 3 another two-sided execution message is generated and transmitted by the exchange. However, unlike the prior instances of the two-sided execution message (e.g., in step 320), the order ID referenced for the buy side of this executed trade will be order ID 5 (e.g., the order ID that was additionally generated and associated with order ID 1 in the first two-sided execution message).

Once the quantity of order 3 is reduced to zero, the exchange may generate and send an electronic data message that provides an opportunity for user 3 to submit additional quantity (e.g., similar to user 1) for order 3 (e.g., because order 3 satisfied the priority trading requirements by having an initial size of greater than 100).

In certain example embodiments, the priority timer may be reset or additional time may be added to the timer. In certain example embodiments, each side of the order book has an independently maintained priority timer. In certain example embodiments, no additional time is added to the timer. In certain example embodiments, a user or client may expressly decline (via a corresponding computer system) to submit additional quantity. If a user takes this action, then the placeholder order (order 3 with zero quantity) may be immediately removed from the order book in the priority trading mode for that side of the order book may be terminated. This may allow additional orders to process (e.g., those orders that had been blocked by the priority order). In certain example embodiments, such an indication may prematurely end the priority timer. However, in the example shown in FIGS. 3A-3F, user 3 does not submit any additional quantity when order 3 is given priority.

In step 336, a new order is received from user 8. After being assigned an order ID of 8, it is processed by the matching engine processor and added to the order book in step 338. As with order 6, order 8 is not matched because order 3 has priority while the priority timer is still active. In other words, both order 1 (which is publically represented as order 5 in the real-time electronic market data feed) and order 3 are effectively "blocking" the remainder of the orders within the order book. In step 340 an add order message is generated and sent out for order 8.

In certain example embodiments, orders that arrive while the priority timer is active, but have a better price than a current order with priority will obtain priority. In other words, if order 8 were to arrive with a price of 99, then it would execute ahead of order 3—even though the priority trading mode has been activated. In other example embodiments, orders that arrive at a better price as still placed "after" the order that original had priority. In certain example embodiments, orders that are within a predetermine price range (e.g., 1 or 2 screen ticks) are placed after the original order with priority and orders outside the range will execute before the original order with priority.

In any event, in step 342, the priority timer expires. The priority timer may be microseconds, milliseconds, second, minutes, or hours in length. In response to the expiration of the priority timer, in step 344, the exchange (or another computer system) generates and transmits electronic market data updates for both order 5 (not order 1) and order 3.

In certain example embodiments, the messages generated by the exchange for the real-time electronic data feed are order replace messages (e.g., as shown in table 16 below). The order replace message update the status of the order book to reflect the order book exiting the priority trading mode. The order replace messages may include data fields that indicate the previously prioritized orders (e.g., 3 or 5) are no longer being traded in a priority mode (thus indicating through the public market data feed that the priority timer has expired). Here, the order replace messages for both orders 3 and 5 (e.g., as discussed below in table 16) may have a priority flag set to 0.

In step 346, after exiting the priority trading mode, the matching engine processor performs a matching process on the resting order book and in step 348 a match is identified between order 5 and order 8. In step 350 a two-sided execution message is set for the match of order 5 against order 8. No priority is indicated in this message because order 8 did not satisfy the minimum size requirement to qualify for priority (and order 1/5 is not yet exhausted).

Description of FIG. 4

FIG. 4 is a flow chart of an example computer process implemented on an exchange computing according to certain example embodiments. The flow chart shown in FIG. 4 may include elements or steps shown in FIGS. 3A-3F.

In step 400, the process begins where new orders are received and handled in step 402. For example, a new order may be received from a client system 102 via network interface 106, handled by transaction request handler 107, and then passed onto matching engine processor for execution/action against electronic order book 110.

In step 404, electronic data messages are generated and transmitted as part of an electronic data feed (e.g., that is real-time). The electronic data feed can be received by a client computer system and used to construct (e.g., programmatically) the current state of the order book (e.g., the market). The information received by client computer system may, for example, by stored in a database maintained by the client computer system and used to programmatically determine what action to take or detail to present (e.g., such as an alert or notification regarding the status of the "market"). For example, an alert or notification may be generated as a result of receiving (and subsequently programmatically recognizing) that an order book as switched to a priority trading mode. The process may loop between 402 and 404 as new orders are received, processed, and indications of such are transmitted as part of the electronic data feed.

In step 406, orders in the electronic order may be matched. In step 408, as a result of the matching process, the exchange determines whether any of the orders that were part of the matching process are eligible for priority trading. As discussed above, there may be one or more requirements for determining if an order is eligible for further priority trading. One requirement may be if the order has a certain amount of quantity left for that order. In certain examples, the amount is 0. Another requirement, may be whether or not the order had a submitted quantity (or its largest quantity if the order was later modified) that exceeded a minimum amount (e.g., the examples in FIGS. 3A-3F use a minimum of 100). Another possible requirement may be that priority may be restricted to certain client types or clients. Another possible requirement may be that priority is only activated when the market is sufficiently unbalanced. In other words, if there are many more buy orders than sell orders, priority may not be activated (or may be activated) based on that determination. Conversely, priority may be activated (or not activated) for the sell side of the electronic order book because of the imbalance.

In any event, if none of the orders are eligible for priority then the process ends (or returns to step 402 to continue processing incoming orders). However, if at least one of the orders is eligible for priority, then a priority timer is started in step 410.

In step 412, along with starting the priority timer, new order IDs may be generated for those orders that will be part of the priority trading mode that will be initiated. The new order IDs act as "new" orders for purposes of the public electronic data feed that is used to broadcast the current "state" of the electronic order book. In certain example embodiments, the order IDs occupy a different field of the order that is eligible for priority (e.g., a priority ID field). In other example embodiments, a new order may be generated with a new ID and linked to the old order.

In step 414, once the new order IDs are generated, the exchange generates and transmits and electronic data message to client system(s) of the user and/or clients associated with the priority eligible orders. The electronic data message transmitted to the client system(s) of the user/client may include the newly generate order ID, information regarding the priority timer (e.g., when the timer will expire, etc. . . . ), and the like.

In step 416, clients (or the client computer systems associated therewith) that received the priority trading mode information may transmit further electronic data requests to the exchange for processing. These electronic data requests may be requests to add additional size to the order(s) with priority. For example, one electronic data request may be a request to modify the existing priority order with 100 additional size.

After processing the new electronic data requests, match processing is performed in step 418 by a matching engine processor. When the buy/sell side of an order book has an order with priority, only that order will be acted upon while the priority timer is active. Alternatively, or in addition, if another order with a better price is received, then the order with the better price may be acted upon. In other words, if an order book is sorted on price/time priority then even if an order with priority has priority in time, it may still not have priority in terms of price (or any other attribute that is used to match orders, such as volume, total client volume, etc. . . . ).

Based on any matched orders in step 418, the exchange may generate and transmit electronic data feed updates based on the orders that were matched using priority. Example messages are described in greater detail below in include, for example, a two-sided execution message that includes data fields that indicate the order has been matched with priority.

The process of 416, 418, and 418 repeats until the priority timer expires in step 422.

Once the priority timer expires, in step 424 the matching engine processor performs a matching process on the resting order book. In other words, when matching is no longer performed using priority where one order can block multiple other orders at the same price level (even if that one order is not executing), there may be other orders (e.g., that were received in the meantime) that may be matched.

In step 426, the process ends (or returns to step 402 to receive further orders).

Description of FIG. 5

FIG. 5 is a block diagram of an exemplary computing system 500 according to certain example embodiments (e.g., an exchange computing system as described in FIG. 1, a user device as shown in FIG. 1, etc. . . . ). Computing system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. A storage system may comprise cache memory that are on the computer chip of CPU 1, RAM 506, storage 508, hardware registers, external systems 522, and the like.

In certain example embodiments, an electronic order book may be stored in the storage system of the computing system. In certain examples, portions of the electronic order book and/or instructions for software functionality described herein may be concurrently stored one or more memory devices that include cache memory, RAM 506, storage 508, hardware registers, and/or external systems 522.

In certain example embodiments, the processing system 502 is programmed (e.g., via a series of program instructions) to carry out the process and/or one or more of the steps shown in FIG. 4. In certain example embodiments, the processing system is programmed so that one core (e.g., CPU 1) handles all processing for a given electronic order book (e.g., a first instrument), while another core (e.g., CPU 2) handles processing for another electronic order book (e.g., a second instrument).

In certain example embodiments, the processing system is programmed to implement functionality associated with the transaction request handler, the matching engine processor, and/or the electronic data feed manager as shown and described in connection with FIG. 1. Additionally functionality may also be programmatically implemented for an example computing system. In certain example embodiments, the processing system is programmed to achieve the results shown in FIGS. 2A-2C and/or 3A-3F.

The system bus 504 communicates with user input adapter 510 (e.g., PS/2, USB interface, or the like) that allows users in input commands to computing system 500 via a user input device 512 (e.g., a keyboard, mouse, touch panel, or the like). The results of the processing may be displayed to a user on a display 516 (e.g., an LCD) via display interface 514 (e.g., a video card or the like). In certain example embodiments, commands to computing system 500 may be provided via network interface 518 (discussed below). In certain example embodiments, representations of the electronic order book and/or processing of the electronic order book may be displayed on display 516 or a display that is communicatively coupled to computing system 500 via network interface 518. In certain example embodiments, orders for an example exchange computing system implemented via computing system 500 may be directly entered via user input device 512. Certain examples embodiments may include one or more user input adapters (e.g., a keyboard and mouse). Certain example embodiments may include one or more output devices (e.g. multiple monitors and/or multiple display interfaces).

The computing system 500 may also include a network interface 518 (e.g., a transceiver) to facilitate wired (e.g., Ethernet—802.3x) and/or wireless communication (WiFi/802.11x protocols, cellular technology, and the like) with external systems 522, databases 520, and other systems via network 524. External systems 522 may include other processing systems, systems that provide third party services, etc. External systems 522 may be client devices or server systems.

In certain example embodiments, an electronic data feed may be provided to external computing systems via network interface 518 and use or be based on the ITCH protocol. For example, an exchange computing system may transmit, as part of an electronic data feed, electronic message to client computer systems. Respective client computing systems may receive such messages via an included network interface. The data included in the messages may be processed by a processor of the client computing system and incorporated into a data structure that is maintained by the client computing system that is either similar to the order book or different. In certain example embodiments, images (e.g., that represent total volume or a number of orders) may be generated and presented via displays coupled to the client computing system.

In certain example embodiments, messages for the electronic data feed (e.g., from an electronic exchange computing system) are formed based on the example specification discussed in more detail below. For example, processing system (e.g., via electronic data feed manager 115), generates a message according to the below discussed specification based on changes to the electronic order book stored in the storage system of the electronic exchange. The generated message may then be transmitted, via network interface 518, to other computing systems, such as client computer systems. Client computer systems may be programmed to receive such messages and, for example, store the received message to a database or incorporate the information into a visual representation of the electronic order book (e.g., that the order book is trading using a priority mode or display the best bid and/or offer, etc. . . . ).

External systems 522 may also include network attached storage (NAS) to hold large amounts of data. External systems, along with the internal storage and memory, may form a storage system for storing and maintaining information (e.g., order book information, routing strategies, etc. . . . ). Such a system may communicate with users and/or other computing systems that process electronic order data messages. For example, an external system may be specifically programmed to provide market data feed updates to subscribing client computer systems based on changes to the order book managed by the exchange. The database 520 may include relational, object orientated, or other types of databases for storing information (e.g., order book information for a financial instrument).

In certain example embodiments, the storage system of the computer system may store instructions that cause one or more processors (e.g., the processing system) of the computer system to perform each or any combination of actions described herein as performed by, for example, an exchange computer system, a client computer system, and/or an external computer system.

In certain example embodiments, a method can include each or any combination of actions described herein as performed by an exchange computer system, including the exchange computer systems of claims 1 and/or 5. In certain example embodiments, a method can include each or any combination of actions described herein as performed by a user device.

In certain example embodiments, a computing system includes each or any combination of the components shown as included in the exemplary computing system 500 of FIG. 5, where the each or any combination of the components are configured to perform the method(s) in the above paragraph(s) or the processes shown in FIGS. 2A-4.

In certain example embodiments, a processor is configured or programmed to perform the method(s) above and/or the processes shown in FIGS. 2A-4.

The processes, techniques, and the like, described herein (for client devices, server, exchange, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 5 may be included into one cohesive physical structure (e.g., such as a tablet device). The components and functionality shown in FIGS. 1-4 may be implemented on or in conjunction with the example computing system shown in FIG. 5 (e.g., to thereby create a specific purpose computing machine).

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM or cache to a processor; (ii) or instructions for a process may be stored in an instruction register and loaded by a processor. Instructions and/or data may be carried or delivered over other types of transmission mediums (e.g., wire, wireless, optical, etc.) and/or transmitted according to numerous formats, standards or protocols, such as Ethernet (or IEEE 802.3), SAP, ATP, Bluetooth, and TCP/IP, TDMA, CDMA, 3G, etc.; Such transitory signals may be coupled to non-transitory media (e.g., RAM, cache, hard drive, a receiver, registers, etc. . . . ), thus transitory signals will be coupled to non-transitory media. The transitory and non-transitory signals, instructions, and/or data, may be encrypted to ensure privacy or prevent fraud in any of a variety of ways well known in the art.

The following are example messages and corresponding specifications for those message.

Example Protocol Specification

TABLE 1

Example Data Field Types

| Type | Size | Description |
| --- | --- | --- |
| Alpha | Variable | Left justified and right padded. |
| Numeric | 1, 2, 4 or 8 bytes | Unsigned integer encoded in network order. |
| Price | 4 bytes | Signed integer encoded in network order. The number of decimals is specified in the order book directory message. |
| Date | 4 bytes | Unsigned integer encoded in network order. The value of the field is (year*10000) + (month*100) + day. YYYYMMDD |

In certain example embodiments, timestamps are sent in two separate parts. One part may be a standalone message that carries the current second (e.g., as recognized by an example exchange computer system) and another part may be a nanosecond field that is included in other message types. electronic order data messages.

TABLE 2

Example Timestamp Message Types

| Timestamp Portion | Message Type | Notes |
| --- | --- | --- |
| Seconds | Standalone message | Unix time (number of seconds since 1970-01-01 00:00:00 UTC) Note: a timestamp second message may be sent for every second having at least one other ITCH message. |
| Nanoseconds | Field within individual messages. | Reflects the number of nanoseconds since the most recently communicated second. |

In certain example embodiments, an example electronic timestamp data message of a second message type may have the following fields:

TABLE 3

Example Timestamp Message

| Name | Offset | Length | Value | Notes |
| --- | --- | --- | --- | --- |
| Message Type | 0 | 1 | "T" | Timestamp - seconds message |
| Second | 1 | 4 | Numeric | Unix Time (Number of seconds since 1970-01-01 00:000:00 UTC) |

In certain example embodiments, at the start of each trading day, directory messages for an order book are sent for all active securities (for example, U.S. treasuries) in the exchange system. Order book directory messages may also be sent intraday when existing securities are modified or new securities are added. An example order book directory message is as follows:

TABLE 4

Example Order Book Directory Message

| Field Name | Offset | Length | Value | Notes |
| --- | --- | --- | --- | --- |
| Message Type | 0 | 1 | "R" | Order book Directory Message |
| Timestamp - Nanoseconds | 1 | 4 | Numeric | Nanoseconds portion of the timestamp. |
| Order book ID | 5 | 4 | Numeric | Unique identifier of an Order book. This identifier will not change until this security is no longer tradable. |
| Symbol | 9 | 20 | Alpha | UST security symbol in the eSpeed trading system e.g. usg_05Y |
| Security Description | 29 | 16 | Alpha | Instrument Description |
| CUSIP | 45 | 9 | Alpha | CUSIP code identifying security |
| TSID | 54 | 1 | Numeric | Trading System ID handling this security |
| Product | 55 | 1 | Numeric | Values:<br>1 = US Treasury ( Notes and Bonds)<br>2 = US Treasury Bills<br>3 = US Treasury FRNs<br>4 = TIPS |
| Product Subtype | 56 | 1 | Numeric | Values:<br>1 = Benchmark<br>2 = Off-the-Run<br>3 = WI |
| Price Type | 57 | 1 | Alpha | Indicates<br>"U" ('per unit' price type)<br>The security of this type trades in fractions of $256^{th}$.<br>"Y" (price as percentage)<br>The security of this type trades in Yield. The number of decimal places in price is specified by "Price Decimals" field.<br>"B" (Yield Spread)<br>The security of this type trades in basis point. The spread is specified by "Price Decimals" field. |
| Price Decimals | 58 | 2 | Numeric | The number of decimals used in price or yield for this order book in eSpeed system. |
| Yield Decimals | 60 | 2 | Numeric | For securities that do not trade in Yield but will have yield published, this field describes number of decimals for yield field. If Yield Decimals is set to −1 then Yield field should be ignored in all messages for this security. |
| Coupon Decimals | 62 | 2 | Numeric | The number of decimals used in the Coupon field. If Coupon is not used, this field will be set to −1. |
| Quantity Multiplier | 64 | 4 | Numeric | For example, 1 million is used for US Treasury Notes. |
| Price Tick Size | 68 | 2 | Numeric | The price tick for the instrument |
| Maturity | 70 | 4 | Numeric | Maturity date |
| Coupon | 74 | 4 | Numeric | Coupon Rate |
| Dated Date | 78 | 4 | Numeric | Dated Date |
| Issue Date | 82 | 4 | Numeric | Issue Date |
| Auction Date | 86 | 4 | Numeric | Auction Date |
| Announcement Date | 90 | 4 | Numeric | Announcement Date |
| First Coupon Date | 94 | 4 | Numeric | First Coupon Date |
| Settlement Date | 98 | 4 | Numeric | Settlement Date |
| Index | 102 | 4 | Numeric | Index Reference Rate |
| Spread | 106 | 4 | Numeric | Spread Rate |
| Trading Features | 110 | 2 | Numeric | 2 Byte field specifying features supported by this security. |

TABLE 4-continued

Example Order Book Directory Message

| Field Name | Offset | Length | Value | Notes |
|---|---|---|---|---|
| | | | | Supported features are represented by the corresponding bit being set. Bits in hex: 0x0001 - Locked Market supported 0x0002 - Priority supported 0x0004 - Continuous Block Trading supported 0x0008 - Discretion supported 0x0010 - Grey Discretion supported |
| Minimum Entry Quantity | 112 | 4 | Numeric | The minimum visible quantity of the order allowed to be added to the book. |
| Minimum Quantity Increment | 116 | 4 | Numeric | The minimum increment for visible quantity of the order. |
| Minimum Block Quantity | 120 | 4 | Numeric | The minimum Continuous Block Trading quantity of the order allowed to be added to the book. |
| Maximum Block Bid/Offer Spread | 124 | 4 | Numeric | The visible bid/offer spread on the reference instrument must not exceed this value for dark blocks to match |
| Minimum Block Bid/Offer size | 128 | 4 | Numeric | Visible bid and offer quantities must both meet or exceed this value for dark blocks to match. |
| Minimum Discretion Quantity | 132 | 4 | Numeric | The minimum discretion quantity of the order allowed to be added to the book. |
| Discretion Price Tick Size | 136 | 2 | Numeric | The price tick size for the discretion order for this instrument |
| Maximum Discretion Bid/Offer Spread | 138 | 4 | Numeric | The visible bid/offer spread on the reference instrument must not exceed this value for discretion orders to trade |
| Discretion Market Zone | 142 | 4 | Numeric | Discretion order will only be considered for trading when the discretion order is within number of ticks from best bid/offer specified by market_zone |

In certain example embodiments, an exchange (or a computing system associated with the exchange) may generate and transmit a combination order book director message. This message a specialized directory message used when combined order books are traded in the marketplace. This message type can include standard combinations defined by the exchange (or its operator) and customized combinations created by market participants (or members who subscribe to the electronic data feed. In certain example embodiments, intraday transmissions of this message may occur when new combination order books are added to the system (e.g., for customized combinations). Updates to existing combination order books may also be represented by intraday combination order book directory messages. An example format of a combination order book directory message is follows:

TABLE 5

Example Combination Order Book Directory

| Field Name | Offset | Length | Value | Notes |
|---|---|---|---|---|
| Message Type | 0 | 1 | "M" | Combination Order book Directory Message |
| Timestamp - Nanoseconds | 1 | 4 | Numeric | Nanoseconds portion of the timestamp. |
| Order book ID | 5 | 4 | Numeric | Unique identifier of an Order book. This identifier will not change until the security is no longer tradable. |
| Symbol | 9 | 20 | Alpha | UST security symbol in the eSpeed trading system |

TABLE 5-continued

Example Combination Order Book Directory

| Field Name | Offset | Length | Value | Notes |
|---|---|---|---|---|
| Security Description | 29 | 16 | Alpha | Instrument Description |
| CUSIP | 45 | 9 | Alpha | Where applicable |
| TSID | 54 | 1 | Numeric | Trading System ID handling this security |
| Product | 55 | 1 | Numeric | Values:<br>1 = US Treasury Coupon Roll<br>2 = US Treasury Bill Roll<br>3 = US Treasury FRN Roll<br>4 = TIPS Roll |
| Price Type | 56 | 1 | Alpha | Indicates<br>"U" ('per unit' price type)<br>The security of this type trades in fractions of $256^{th}$.<br>"Y" (price as percentage)<br>The security of this type trades Yield. The number of decimal places in price is specified by "Price Decimals" field.<br>"B" (Yield Spread)<br>The security of this type trades in basis point. The spread is specified by "Price Decimals" field. |
| Price Decimals | 57 | 2 | Numeric | The number of decimals used in price or yield or spread for this order book in eSpeed system. |
| Quantity Multiplier | 59 | 4 | Numeric | For example, 1 million is used for US Treasury Notes. |
| Price Tick Size | 63 | 2 | Numeric | The price tick for the instrument |
| Yield Decimals | 65 | 2 | Numeric | For securities that do not trade in Yield but will have yield published, this field describes number of decimals for yield field. If Yield Decimals is set to −1, then Yield field should be ignored in all messages for this security. |
| Odd Lot Size | 67 | 4 | Numeric | Indicates the number of securities that represent an odd lot for the order book.<br>Note: A value of 0 indicates that this lot type is undefined for the order book. |
| Block Lot Size | 71 | 4 | Numeric | Indicates the number of securities that represent a block lot for the order book.<br>Note: A value of 0 indicates that this lot type is undefined for the order book. |
| Nominal Value | 75 | 8 | Numeric | Nominal Value |
| Leg 1, Symbol | 83 | 20 | Alpha | Leg Symbol |
| Leg 1, Side | 103 | 1 | Alpha | Values:<br>B = As Defined<br>C = Opposite |
| Leg 2, Symbol | 104 | 20 | Alpha | Leg Symbol |
| Leg 2, Side | 124 | 1 | Alpha | Values:<br>B = As Defined<br>C = Opposite |
| Leg 3, Symbol | 125 | 20 | Alpha | Leg Symbol |
| Leg 3, Side | 145 | 1 | Alpha | Values:<br>B = As Defined<br>C = Opposite |
| Leg 4, Symbol | 146 | 20 | Alpha | Leg Symbol |
| Leg 4, Side | 166 | 1 | Alpha | Values:<br>B = As Defined<br>C = Opposite |
| Trading Features | 167 | 2 | Numeric | 2 Byte field specifying features supported by this security. Supported features are |

TABLE 5-continued

Example Combination Order Book Directory

| Field Name | Offset | Length | Value | Notes |
|---|---|---|---|---|
| | | | | represented by the corresponding bit being set. Bits in hex: 0x0001 - Locked Market supported 0x0002 - Priority supported 0x0004 - Continuous Block Trading supported 0x0008 - Discretion supported 0x0010 - Grey Discretion supported |
| Minimum Entry Quantity | 169 | 4 | Numeric | The minimum visible quantity of the order allowed to be added to the book. |
| Minimum Quantity Increment | 173 | 4 | Numeric | The minimum increment for visible quantity of the order. |
| Minimum Block Quantity | 177 | 4 | Numeric | The minimum Continuous Block Trading quantity of the order allowed to be added to the book. |
| Maximum Block Bid/Offer Spread | 181 | 4 | Numeric | The visible bid/offer spread on the reference instrument must not exceed this value for dark blocks to match |
| Minimum Block Bid/Offer size | 185 | 4 | Numeric | Visible bid and offer quantities must both meet or exceed this value for dark blocks to match. |
| Minimum Discretion Quantity | 189 | 4 | Numeric | The minimum discretion quantity of the order allowed to be added to the book. |
| Discretion Price Tick Size | 193 | 2 | Numeric | The price tick size for the discretion order for this instrument |
| Maximum Discretion Bid/Offer Spread | 195 | 4 | Numeric | The visible bid/offer spread on the reference instrument must not exceed this value for discretion orders to trade |
| Discretion Market Zone | 199 | 4 | Numeric | Discretion order will only be considered for trading when the discretion order is within number of ticks from best bid/offer specified by market_zone |

In certain example embodiments, a system event message may be provided that is used to signal a market or data feed handler event. An example format of such a message is follows:

TABLE 6

Example System Event Message

| Field Name | Offset | Length | Value | Notes |
|---|---|---|---|---|
| Message Type | 0 | 1 | "S" | System Event Message. |
| Timestamp | 1 | 4 | Numeric | Nanoseconds portion of the timestamp. |
| TSID | 5 | 1 | Numeric | ID for eSpeed UST trading system/room (system level only) |
| Event Code | 6 | 1 | Alpha | See System Event Codes below. |
| Event Reason | 7 | 1 | Alpha | Please see the System Event Reason Table |
| Order book ID | 8 | 4 | Numeric | Used to identify if the event applies to a single order book within the Trading System. Order book Code set to 0 if the event applies at a System level. |

In certain example embodiments, an electron market data feed may have the following event codes and event reasons that may be used on a daily basis for the data feed.

TABLE 7

Example System Daily Event Codes

| Code | Explanation |
| --- | --- |
| "O" | Start of Messages. Outside of time stamp messages, the start of day message is the first message sent in any trading day. This indicates the System is enabled. |
| "Q" | Start of Trading Session hours. This message is intended to indicate that eSpeed trading system is open and ready to trade |
| "M" | End of Trading Session hours. This message is intended to indicate that eSpeed trading session is closed and no orders are available for execution. |
| "C" | End of Messages. This is always the last message sent in any trading day. This indicates the system is disabled. |

TABLE 8

Example System Event Reason

| System Event Reason | Explanation |
| --- | --- |
| "I" | Accepting/Holiday session starts. This is applicable to Japan holidays |
| "A" | Break. This is applicable to potential breaks including UK Holidays |
| "B" | Resumption after Break. This is applicable potential breaks and resumptions including UK holidays |
| "H" | Early Close. This indicates the early market close |
| "R" | Regular start of the day or end of the day. |
| Reserve | Reserve |

The following is an example order book state message that relays information concerning state changes in the exchange or an order book (or a group of order books) of the exchange.

TABLE 9

Example Order Book State Message

| Field Name | Offset | Length | Value | Notes |
| --- | --- | --- | --- | --- |
| Message Type | 0 | 1 | "O" | Order book State Message. |
| Timestamp - Nanoseconds | 1 | 4 | Numeric | Nanoseconds portion of the timestamp |
| Order Book ID | 5 | 4 | Numeric | Order book identifier |
| State | 9 | 2 | Numeric | |
| Reserved | 11 | 4 | Numeric | |
| Reserved | 15 | 4 | Numeric | |

In certain example embodiments, an electronic market data feed can include a trade state information messages that rely information on trading of workups to the trading community.

TABLE 10

Example Trade State Message

| Field Name | Offset | Length | Value | Notes |
| --- | --- | --- | --- | --- |
| Message Type | 0 | 1 | "W" | UST security Trading State Message. |
| Timestamp - Nanoseconds | 1 | 4 | Numeric | Nanoseconds portion of the timestamp. |
| Order Book ID | 5 | 4 | Numeric | Unique Order book identifier of a UST security(or an order book) |
| Trading State | 9 | 1 | Alpha | Indicates the current trading state for the stock. Allowable values: "1" = Trade State "0" = BID/OFFER State |
| Trade Price | 10 | 4 | Price | The price of execution initiating trade state. The value will be set to zero and should be ignored in BID/OFFER state. |
| Trade Indicator | 14 | 1 | Alpha | Values; "H" = Hit "T" = Take The value should be ignored in BID/OFFER state. |

In certain example embodiments, an electronic market data feed may include one or more different types of add order messages. An add order message may indicate that a new order has been accepted by the exchange was added to an electronic order book (e.g., one that is publically visible). Step 318 in FIG. 3A may be an example of an add order message. An add order message may include a trading day unique Order Reference Number that is unique per Order book used by exchange to track the order.

The following is an example add order type that may generated in response to acceptable of an unattributed order by the exchange.

TABLE 11

Example Add Order Message

| Field Name | Offset | Length | Value | Notes |
|---|---|---|---|---|
| Message Type | 0 | 1 | "A" | Add Order - No MPID Attribution Message. |
| Timestamp - Nanoseconds | 1 | 4 | Numeric | Nanoseconds portion of the timestamp. |
| Order Reference Number | 5 | 4 | Numeric | The unique reference number assigned to the new order at the time of receipt. |
| Transaction ID | 9 | 4 | Numeric | Transaction ID corresponding to the transaction ID in the response message. |
| Order book ID | 13 | 4 | Numeric | Unique Order book identifier of an instrument |
| Side | 17 | 1 | Alpha | The type of order being added. "B" = buy order. "S" = sell order. |
| Quantity | 18 | 4 | Numeric | The visible quantity of the order being added to the book. |
| Price | 22 | 4 | Price | The display price of the new order. |
| Yield | 26 | 4 | Price | The display yield of the new order. Optional field. If Yield Decimals was set to −1 then this field should be ignored. |

In certain example embodiments, an electronic market data feed may include one or more different types of modify order messages. Modify order messages may include messages that relate to cancellation, execution, replacement, or modification of an order. A modify order message may include an Order Reference Number (as discussed above), Order book ID, and side of the Order to which the update applies.

In examples, the information from multiple different messages may be used to glean information that is otherwise not directly provided by one message. For example, to track the displayed quantity for an order, a subscriber may deduct the quantity in a cancel message (X) and/or order execution messages (E, C, and D) from the last known display quantity for that order. In the case of a replace message (U), the in the message completely replaces the displayed quantity. In certain examples, orders should be removed from the electronic order book when their display quantity reaches zero unless the order has a priority attribute.

In certain example embodiments, an order executed message is provided and is sent whenever an order in the electronic order book is executed in whole or in part. If the incoming or aggressive order causing the match cannot be fully filled, the remainder of that order will be placed in the book after the match has occurred.

As discussed herein, in certain instances it is possible to receive several order executed messages for the same order reference number if that order is executed in several parts (see, e.g., steps 444a and 444b in FIG. 4B). In such instances, multiple order executed messages on the same order are cumulative (e.g., 500+400+5 mean that an aggressive order of 905 fulfilled those three orders). As shown in FIG. 4B, multiple order executed messages that relate to the same aggressive or incoming will have same Transaction ID.

In certain example embodiments, a passive order may gain priority as result of execution. In such a situation, a new place-holder in the electronic order book is created for the priority order with new priority order reference that is set to a size of zero and the price of the original order. New orders entering the book at the same price will have a natural position after this placeholder and will be traded after the priority state is completed.

When the displayed quantity for a priority order reaches zero, it may retain its position in the book until the priority flag is removed by as indicated by a replace message. The display quantity of a priority order will be refilled in its original position in the book.

TABLE 12

Example Order Executed Message

| Field Name | Offset | Length | Value | Notes |
|---|---|---|---|---|
| Message Type | 0 | 1 | "E" | Order Executed Message. |
| Timestamp - Nanoseconds | 1 | 4 | Numeric | Nanoseconds portion of the timestamp. |
| Order Reference Number | 5 | 4 | Numeric | The order reference number associated with the executed order. |
| Transaction ID | 9 | 4 | Numeric | Transaction ID corresponding to the transaction ID in the response message. |
| Order book ID | 13 | 4 | Numeric | Unique Order book identifier |
| Side | 17 | 1 | Alpha | The type of order being traded. Values; "B" = buy order "S" = sell order |
| Executed Quantity | 18 | 4 | Numeric | The quantity executed. |
| Match ID | 22 | 14 | Alpha | The day unique Match Number of this execution |
| Priority Order Reference Number | 36 | 4 | Numeric | Indicate priority for an order if the field value is not zero. This field is a new Order Reference Number for Priority Order with size zero and price of the original order that needs to be added to the book. It serves the purpose of a placeholder in the book, where additional size can be added to this priority orders. |

In certain example embodiments, an order executed with price message is provided as part of an electronic market data feed. This message may be sent in the event that an order in the book is executed in whole or in part at a price different from the initial display price. As the execution price for this order is different than the displayed price of the original add order message, the Exchange may include a price for this execution message.

In certain examples, If the incoming order causing the match cannot be fully filled, the remainder will be placed in the book after the match has occurred. In certain instances, it is possible to receive multiple order executed and order executed with price messages for the same aggressive or incoming order if that order is executed in several parts. Messages for the same order are cumulative. In certain examples, these executions may be marked as non-printable to inform subscribers to ignore this message for purposes of time-and-sales displays or volume calculations. This may be prevent double counting occurrences.

TABLE 13

Example Order Executed With Price Message

| Field Name | Offset | Length | Value | Notes |
|---|---|---|---|---|
| Message Type | 0 | 1 | "C" | Order Executed Message. |
| Timestamp - Nanoseconds | 1 | 4 | Numeric | Nanoseconds portion of the timestamp. |
| Order Reference Number | 5 | 4 | Numeric | The unique reference number associated with the executed order. |
| Transaction ID | 9 | 4 | Numeric | Transaction ID corresponding to the transaction ID in the response message. |
| Order book ID | 13 | 4 | Numeric | Unique Order book identifier |
| Side | 17 | 1 | Alpha | The type of order being traded. Values: "B" = buy order "S" = sell order |
| Executed Quantity | 18 | 4 | Numeric | The quantity executed. |
| Match ID | 22 | 14 | Alpha | The unique Match Number assigned by the trading system of this execution. |
| Printable | 36 | 1 | Alpha | Indicates if the execution should be reflected on time and sale displays and volume calculations. |

TABLE 13-continued

Example Order Executed With Price Message

| Field Name | Offset | Length | Value | Notes |
|---|---|---|---|---|
| | | | | "N" = non-printable |
| | | | | "Y" = printable |
| Trade Price | 37 | 4 | Price | The price at which the order execution occurred. |
| Trade Yield | 41 | 4 | Numeric | The yield at which the order execution occurred. This field is optional and will be present only for securities that do not trade in yield and require yield. If Yield Decimals was set to −1 then this field should be ignored. |

In certain example embodiments, a two-sided order executed message may be provided. Orders that trigger such messages may occur when an order in the electronic order book is executed in whole or in part against a new aggressive order which gains priority. In this case the remaining untraded part of the aggressive order is added to the book with priority and maintains its position until priority is gone. It should be noted that it is possible for the new aggressive order to trade out in full. In this case the remaining size is zero, but it still acts as a place holder to maintain the position. The price for the newly added aggressive order is a trade price, so no extra field is provided. This single message is a combination of "E" message (execute) followed by "A" message (add) that would require priority and potentially allow for zero size. This case is identified by the "New Aggressive Order" flag being set to "Y" in the message.

Another circumstance that may trigger this order message type is when an order in the book is executed in whole or in part against another order that already exists in the book. In this case the executed quantity should be removed from accumulated quantity of both orders participating in this execution. Such a situation may occur in a locked market, when existing priority orders trade, or when priority expires and the remaining matching orders in the book are allowed to trade against each other. This case is identified by having the "New Aggressive Order" flag set to "N" in the message.

In certain examples, this order message type is marked as non-printable (e.g., to assist in preventing double counting).

TABLE 14

Example Two-Sided Order Executed Message

| Field Name | Offset | Length | Value | Notes |
|---|---|---|---|---|
| Message Type | 0 | 1 | "D" | Order Executed Message. |
| Timestamp - Nanoseconds | 1 | 4 | Numeric | Nanoseconds portion of the timestamp. |
| Order Reference Number | 5 | 4 | Numeric | The unique reference number associated with the executed passive order in the book. |
| Transaction ID | 9 | 4 | Numeric | Transaction ID corresponding to the transaction ID in the response message. |
| Order book ID | 13 | 4 | Numeric | Unique Order book identifier |
| Side | 17 | 1 | Alpha | The type of passive order in the book being traded. Values: "B" = buy order "S" = sell order |
| Executed Quantity | 18 | 4 | Numeric | The quantity executed. |
| Match ID | 22 | 14 | Alpha | The unique Match Number assigned by the trading system of this execution. |
| Priority Passive Order Reference Number | 36 | 4 | Numeric | Indicate priority for passive order if the field value is not zero. This field is a new Order Reference Number for Priority Order with size zero and price of the original order that needs to be added to the book. It serves the purpose of a placeholder in the book, where additional size can be added to this priority orders. |

TABLE 14-continued

Example Two-Sided Order Executed Message

| Field Name | Offset | Length | Value | Notes |
|---|---|---|---|---|
| New Aggressive Order Flag | 40 | 1 | Alpha | Indicates if this execution is due to new aggressive order or result of trading between two orders existing in the book. Values: "Y" = New Aggressive order "N" = Trade between two existing orders |
| Aggressive Order Reference Number | 41 | 4 | Numeric | The unique reference number associated with the new aggressive order remaining quantity being added to the book. It can be 0 if fully traded |
| Aggressive remaining Quantity | 45 | 4 | Numeric | The remaining aggressive quantity being added to the book. It can be 0 if fully traded. It is also set to zero if the execution is between orders that were already in the book. |
| Aggressive Priority Flag | 49 | 1 | Numeric | Indicate priority attribute of aggressor. This field is a bit map. Low bit will be set to 1 if the order has priority. |
| Printable | 50 | 1 | Alpha | Indicates if the execution should be reflected on time and sale displays and volume calculations. "N" = non-printable "Y" = printable |
| Trade Price | 51 | 4 | Price | The price at which the order execution occurred. |
| Trade Yield | 55 | 4 | Numeric | The yield at which the order execution occurred. This field will be present only for securities that trade in yield and require yield value. If Yield Decimals was set to −1 this field should be ignored. |

In certain example embodiments, an order cancel message is provided that may be sent when an order in the book is modified as a result of either a partial cancellation or complete cancellation. In certain instances, when the display quantity for the retained size reaches zero, the order should be removed from the book.

TABLE 15

Example Order Cancel Message

| Field Name | Offset | Length | Value | Notes |
|---|---|---|---|---|
| Message Type | 0 | 1 | "X" | Order Cancel Message. |
| Timestamp - Nanoseconds | 1 | 4 | Numeric | Nanoseconds portion of the timestamp. |
| Order Reference Number | 5 | 4 | Numeric | The reference number of the order being reduced. |
| Transaction ID | 9 | 4 | Numeric | Transaction ID corresponding to the transaction ID in the response message. |
| Order book ID | 13 | 4 | Numeric | Unique Order book identifier of a UST security |
| Side | 17 | 1 | Alpha | The type of order being added. Values: "B" = buy order "S" = sell order |
| Canceled Quantity | 18 | 4 | Numeric | The quantity being removed from the display size as the result of a cancellation. |

In certain example embodiments, an order replace message is provided for when an order in the book has been modified. For example, when an existing order is changed through an alter action (e.g., changing order attributes of the order and adding quantity to priority order). In such an instances, the side of the order and the order book ID for the order remain the same as the original order. Accordingly, the side and the order book ID cannot be changed for the action that triggers this message. In certain example embodiments, an increase in order size for non-priority orders is done via an action that triggers the add order message. In certain example embodiments, a decrease in order size is accomplished through an action that triggers the cancel order message. In certain example embodiments, a price modification for the order is accomplished with a cancel message followed by an add message.

TABLE 16

Example Order Replace Message

| Field Name | Offset | Length | Value | Notes |
|---|---|---|---|---|
| Message Type | 0 | 1 | "U" | Order Replace Message |
| Timestamp - Nanoseconds | 1 | 4 | Numeric | Nanoseconds portion of the timestamp. |
| Order Reference Number | 5 | 4 | Numeric | The original reference number of the order being replaced. Note that the Order Reference Number does not change when the order is replaced. |

TABLE 16-continued

Example Order Replace Message

| Field Name | Offset | Length | Value | Notes |
| --- | --- | --- | --- | --- |
| Transaction ID | 9 | 4 | Numeric | Transaction ID corresponding to the transaction ID in the response message. |
| Order book ID | 13 | 4 | Numeric | Unique Order book identifier |
| Quantity | 17 | 4 | Numeric | The new visible quantity of the order |
| Priority Flag | 21 | 1 | Numeric | Indicate priority attribute for this order. This field is a bit map. Low bit will be set to 1 if the order has priority. |

In certain example embodiments, non-displayable order types may generate trade execution details. The following is an example trade message that may be generated in such circumstances.

TABLE 17

Example Trade Message

| Field Name | Offset | Length | Value | Notes |
| --- | --- | --- | --- | --- |
| Message Type | 0 | 1 | "P" | Trade Message. |
| Timestamp - Nanoseconds | 1 | 4 | Numeric | Nanoseconds portion of the timestamp. |
| Order book ID | 5 | 4 | Numeric | Unique Order book identifier |
| Executed Quantity | 9 | 4 | Numeric | The quantity executed. |
| Match ID | 13 | 14 | Alpha | The day unique Match Number of this execution. This field will be set to blanks if trade message specifies the total quantity traded for some period of time instead of reporting every non-displayable execution. |
| Trade Price | 27 | 4 | Price | The execution price |

Technical Advantages of Described Subject Matter

According to certain example embodiments, functionality for an existing computer application may be improved without substantially altering certain processing aspects of the application or completely rewriting the application. Instead, a data structure and data feed may be modified or adjusted to incorporate the added functionality. In certain examples, an existing electronic data feed specification may be adapted to work with processing functionality that was previously not supported by the specification.

According to certain examples, benefits that may be realized from the techniques described herein include that the matching processing performed by the electronic exchange computer system (e.g., the Matching Engine Processor in FIG. 1) may incorporate new functionality (e.g., may handle electronic transactions involving priority), while needing little or no modification versus pre-existing matching techniques, as the matching is still performed in a price/time basis. Instead, the electronic order book data structure and/or the networking for the electronic data feed may be updated in order to support such functionality and provide notice to subscribing client computer systems that priority trading or the like is being processed by the exchange computer system.

According to certain example embodiments, a pre-existing order book data structure may be improved upon by incorporating one or more fields (e.g., to hold a priority order ID) into the data structure. This may allow the processing of the order book to still refer to the order/book on a price/time basis (or other sorted basis) using the original order ID (and its associated time information). According to certain example embodiments, an electronic data feed specification (e.g., based on ITCH) that does not include functionality for orders executed using priority (e.g., workup) may be modified to include fields (e.g., a priority order ID field) for existing message types and/or additional message types (e.g., the Two-Sided Order Executed Message in table 14). The added functionality may indicate whether an order has a priority order ID, whether it has been executed while having priority, or the like.

Additional Applications of Described Subject Matter

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. An electronic exchange computing system comprising:
a computer storage system configured to store an electronic order book configured to store a plurality of pending orders;
at least one transceiver configured to:
receive, from remote computing devices, electronic data messages that each include data transaction requests, where a first electronic data message of the electronic data messages includes a first data transaction request;
transmit, to subscribing computing systems, an electronic data communications feed that includes information relating to changes or updates in the electronic order book;

a processing system that includes at least one hardware processor coupled to the computer storage system and the transceiver, the processing system configured to:
  in accordance with execution of a match between a first order with a first order ID and second order with a second order ID, determine that at least the first order has priority over other orders in the electronic order book;
  responsive to determination that the first order has priority, generate a new order ID for the first order and associate it with the first order;
  after execution of the match between the first and second order, maintain the first order in the electronic order book along with the first order ID;
  generate and transmit, via the at least one transceiver and to a client computing system associated with the first order, an electronic data message that indicates the first order has priority;
  receive, via the at least one transceiver, further order data that indicates at least additional quantity for the first order and associate the additional quantity with the first order;
  match, by using the first order ID, at least some of the additional quantity of the first order with at least one other contra-side order; and
  generate, in real-time with the match of at least some of the additional quantity, a data feed update message as part of the electronic data communications feed, the data feed update message including the new order ID of the first order and data indicating the match of the at least some of the additional quantity of the first order and that the match was performed using the priority of the first order.

2. The electronic exchange computing system of claim 1, wherein the data feed update message is a combination of an order execution message and an add message that is associated with the new order ID.

3. The electronic exchange computing system of claim 1, wherein the processing system is further configured to:
  initiate a priority timer;
  responsive to expiration of the priority timer, generate and transmit a second data feed update message as part of the electronic data communications feed, the second data feed update message indicating that the first order and/or the new order ID are no longer being executed in a priority mode.

4. The electronic exchange computing system of claim 1, wherein determination that the first order has priority includes determination that a size associated with the first order exceeded a threshold priority size requirement.

5. The electronic exchange computing system of claim 1, wherein determination that the first order has priority includes a determination that the first order has been fulfilled.

6. The electronic exchange computing system of claim 1, wherein the electronic data communications feed is transmitted according to the ITCH data-feed protocol.

7. The electronic exchange computing system of claim 1, wherein the processing system is configured to organize the electronic order book on a price/time priority basis, where any quantity associated with the first order is matched according priority of the first order ID in the electronic order book and not the new order ID.

8. A method of processing electronic data messages submitted to an electronic exchange computing system that includes 1) a computer storage system, 2) at least one transceiver, and 3) a processing system that includes at least one hardware processor coupled to the computer storage system and the at least one transceiver, the method comprising:
  storing a plurality of pending orders in an electronic order book that is stored in the computer storage system;
  receiving electronic data messages that each include data transaction requests, where a first electronic data message of the electronic data messages includes a first data transaction request;
  transmitting, to subscribing computing systems, changes and/or updates concerning the electronic order book as part of an electronic data communications feed;
  in accordance with execution of a match between a first order with a first order ID and second order with a second order ID, determining that at least the first order has priority over other orders in the electronic order book;
  responsive to determination that the first order has priority, generating, by using the processing system, a new order ID for the first order and associate it with the first order;
  after execution of the match between the first and second order, maintaining the first order in the electronic order book;
  generating and transmitting, via the at least one transceiver and to a client computing system associated with the first order, an electronic data message that indicates the first order has priority;
  receiving, via the at least one transceiver, further order data that indicates at least additional quantity for the first order and associating the additional quantity with the first order;
  matching, by using the processing system, at least some of the additional quantity of the first order with at least one other contra-side order; and
  generating, by using the processing system and in real-time with the match of at least some of the additional quantity, a data feed update message as part of the electronic data communications feed, the data feed update message including the new order ID of the first order and data indicating the match of the at least some of the additional quantity of the first order and that the match was performed using the priority of the first order.

9. The method of claim 8, wherein the data feed update message is a combination of an order execution message and an add message that is associated with the new order ID.

10. The method of claim 8, further comprising:
  initiating a priority timer;
  responsive to expiration of the priority timer, generating and transmitting a second data feed update message as part of the electronic data communications feed, the second data feed update message indicating that the first order and/or the new order ID are no longer being executed in a priority mode.

11. The method of claim 8, wherein determination that the first order has priority includes determination that a size associated with the first order exceeded a threshold priority size requirement.

12. The method of claim 8, wherein determination that the first order has priority includes a determination that the first order has been fulfilled.

13. The method of claim 8, wherein the electronic data communications feed is transmitted according to the ITCH data-feed protocol.

14. The method of claim 8, further comprising:
sorting, by using the processing system, the electronic order book on a price/time priority basis, where any quantity associated with the first order is matched according priority of the first order ID in the electronic order book and not the new order ID.

15. A non-transitory computer readable storage medium storing computer readable instructions for use with an electronic exchange computing system that includes 1) a computer storage system configured to store a plurality of pending orders as part of an electronic order book, 2) at least one transceiver, and 3) a processing system that includes at least one hardware processor coupled to the computer storage system and the at least one transceiver, the computer readable instructions comprising instructions that cause the processing system to:
process electronic data messages sent from remote computing devices, each of the electronic data messages including data transaction requests, where a first electronic data message of the electronic data messages includes a first data transaction request;
cause the at least one transceiver to transmit, to subscribing computing systems, changes and/or updates concerning the electronic order book as part of an electronic data communications feed;
in accordance with execution of a match between a first order with a first order ID and second order with a second order ID, determine that at least the first order has priority over other orders in the electronic order book;
responsive to determination that the first order has priority, generate a new order ID for the first order and associate it with the first order;
generate an electronic data message that indicates the first order has priority and cause the at least one transceiver to transmit the generated electronic data message;
process further received order data that indicates at least additional quantity for the first order, the processing including associating the additional quantity with the first order;
match at least some of the additional quantity of the first order with at least one other contra-side order; and
generate, in real-time with the match of at least some of the additional quantity, a data feed update message as part of the electronic data communications feed, the data feed update message including the new order ID of the first order and data indicating the match of the at least some of the additional quantity of the first order and that the match was performed using the priority of the first order.

16. The non-transitory computer-readable storage medium of claim 15, wherein the data feed update message is a combination of an order execution message and an add message that is associated with the new order ID.

17. The non-transitory computer-readable storage medium of claim 15, wherein the computer readable instructions comprise further instructions that cause the processing system to:
initiate a priority timer;
responsive to determination that the priority timer has expired, generate and transmit, by using the at least one transceiver, a second data feed update message as part of the electronic data communications feed, the second data feed update message indicating that the first order and/or the new order ID are no longer being executed in a priority mode.

18. The non-transitory computer-readable storage medium of claim 15, wherein determination that the first order has priority includes determination that a size associated with the first order exceeded a threshold priority size requirement.

19. The non-transitory computer-readable storage medium of claim 15, wherein the electronic data communications feed is transmitted according to the ITCH data-feed protocol.

20. The non-transitory computer-readable storage medium of claim 15, wherein the electronic order book is ordered on a price/time priority basis and any quantity associated with the first order is matched according priority of the first order ID in the electronic order book and not the new order ID.

* * * * *